United States Patent [19]

Hague et al.

[11] Patent Number: 4,636,858
[45] Date of Patent: Jan. 13, 1987

[54] EXTRACTING DIGITAL DATA FROM A BUS AND MULTIPLEXING IT WITH A VIDEO SIGNAL

[75] Inventors: Duane O. Hague, Huber Heights, Ohio; James E. Barnes, Fort Wayne, Ind.

[73] Assignee: The United States of America as represented by the Secretary of the Air Force, Washington, D.C.

[21] Appl. No.: 666,511

[22] Filed: Oct. 30, 1984

[51] Int. Cl.[4] .......................... H04N 7/087; H04N 7/04
[52] U.S. Cl. .................................... 358/147; 358/141; 364/518; 364/521; 370/85
[58] Field of Search ................ 358/141, 142, 146, 147, 358/903; 364/518, 900, 521; 370/85

[56] References Cited

U.S. PATENT DOCUMENTS

| | | | |
|---|---|---|---|
| 4,218,697 | 8/1980 | Leventer | 358/13 |
| 4,308,558 | 12/1981 | Hernandez et al. | 358/142 |
| 4,335,402 | 6/1982 | Holmes | 358/147 |
| 4,380,027 | 4/1983 | Leventer et al. | 358/147 |
| 4,408,226 | 10/1983 | Dean et al. | 358/147 |
| 4,554,660 | 12/1985 | Noirel et al. | 358/142 |

Primary Examiner—James J. Groody
Assistant Examiner—Michael D. Parker
Attorney, Agent, or Firm—Bernard E. Franz; Donald J. Singer

[57] ABSTRACT

A television video data instrumentation recording system is coupled to a Bus Monitor/Video Encoder to incorporate a digital data recording capability within the normal video signal recording process while allowing for later digital data recovery during video playback. The digital data is acquired from a device addressable serial data bus which is normally an asynchronously polled system for exchanging data messages between a bus master device and multiple slave devices where each slave device has a unique device identification code for its messages. Data acquisition is a passive function (relative to the data bus) involving the hardward programmable selection of messages of interest (based on the message device code) and the software programmable deletion of messages that contain no data of interest. Another feature of data acquisition is that a time reference for time-of-acquisition is appended to the acquired messages of interest. This approach also intercepts the video signal between the television source and the recording system, programmably assembles the acquired data messages into recording data blocks synchronized to the video signal, and performs a formatted serial encoding conversion of the data blocks into a video signal. Once recorded, the video signal can be played back with programmably selected portions of the video subjected to a decoding conversion that recovers the formatting information and data such that the original acquired data messages (and time tag) can be reconstructed with minimum data loss due to recovery errors.

5 Claims, 12 Drawing Figures

BM/VE SYSTEM BLOCK DIAGRAM

BM/VE Concept Application

Fig. 2 BM/VE SYSTEM BLOCK DIAGRAM

VIDEO-ENCODER BLOCK DIAGRAM, VIDEO SECTION

VIDEO-ENCODER BLOCK DIAGRAM, ENCODER SECTION

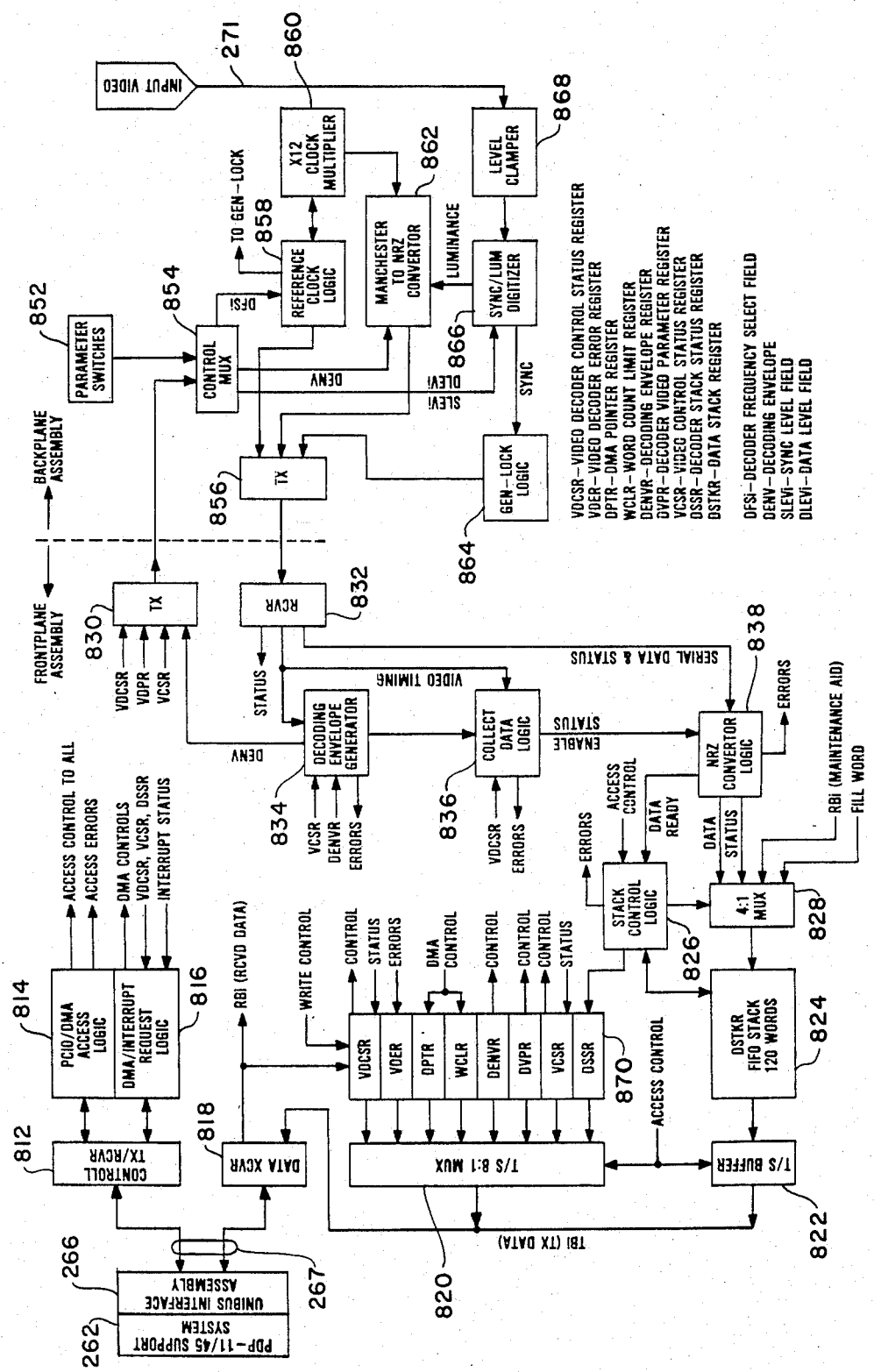

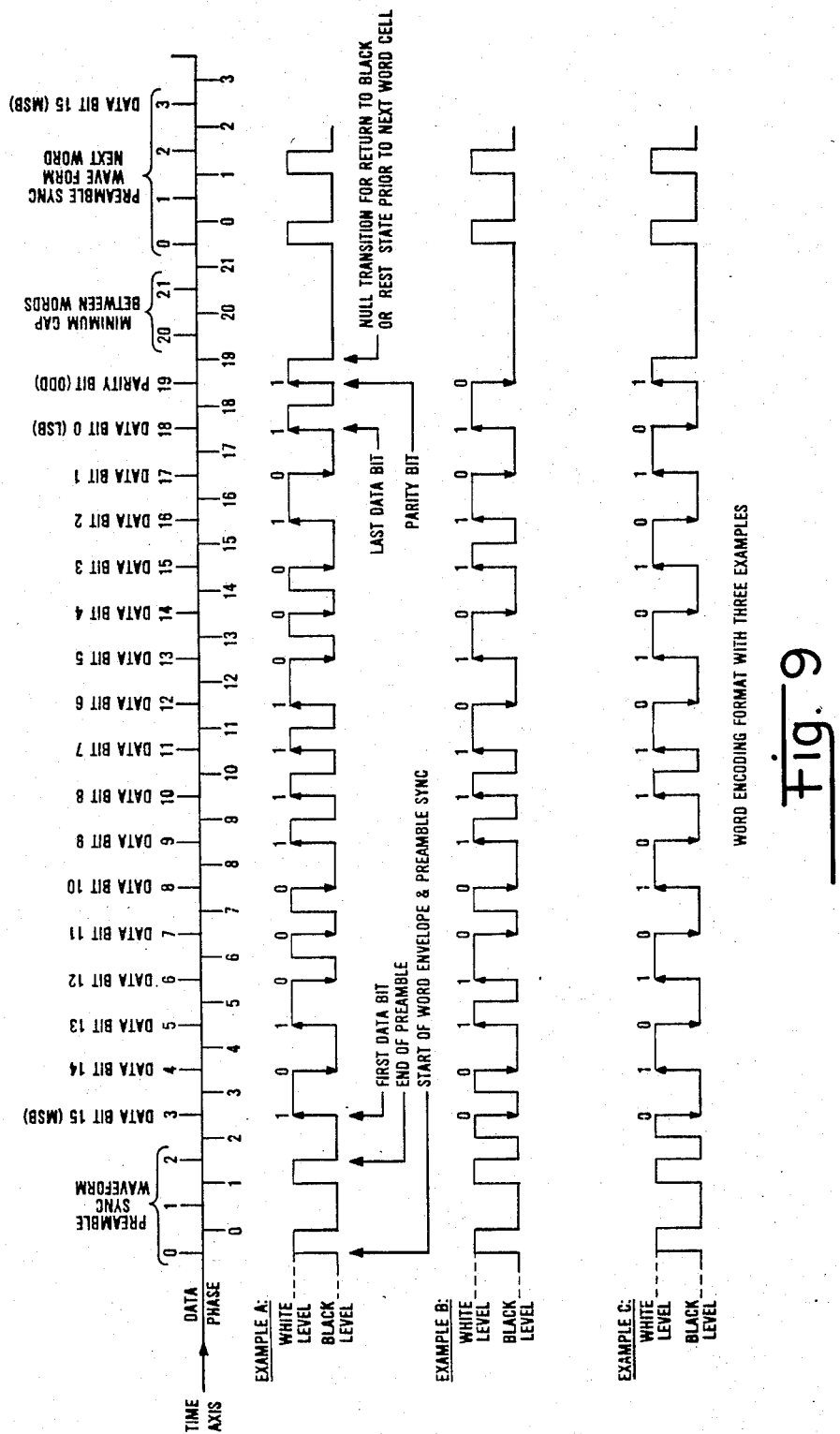
Fig. 9 Word encoding format with three examples

| ENCODED COMMAND CELL CONTENTS ||||
|---|---|---|---|
| BIT | NAME | FUNCTION | NOTES |
| 15 | AFLG | ABORT FLAG          1 = DATA ABORT/ERROR | 1 |
| 14 | DFLG | DATA FLAG           1 = DATA RASTER LINE | |
| 13 | FFLG | FORMAT FLAG         1 = FORMAT RASTER LINE | |
| 12 | VOKTE | VIDEO OK TO ENCODE = 1 | 2 |
| 11 | GLOK | GEN-LOCK OK = 1    0 = UNLOCKED | 3 |
| 10 | EWC2 | ENCODED WORD COUNT | 4 |
| 9 | EWC1 | | |
| 8 | EWC0 | | |
| 7 | RLC 7 | REMAINING LINE COUNT | 5 |
| 6 | RLC 6 | | |
| 5 | RLC 5 | | |
| 4 | RLC 4 | | |
| 3 | RLC 3 | | |
| 2 | RLC 2 | | |
| 1 | RLC 1 | | |
| 0 | RLC 0 | | |

NOTE 1: This indicates a BM/VE data/timing error affecting data recovery.

NOTE 2: VOKTE = 0 indicates that video stability is suspected/bad and will abort any encoding in progress.

NOTE 3: GLOK = 0 indicates that external video is bad and that the BM/VE is substituting internal stable black-field video.

NOTE 4: EWCi specifies the number of encoded word cells following the command cell on any individual raster. EWCi values range from 0 words to 7 words.

NOTE 5: RLCi is a countdown of the remaining encoded rasters within the encoding envelope. The terminating line of each encoding envelope will be a format line with RLCi = FFH.

Command Cell Format

Fig. 10

EXAMPLES OF ENCODING ENVELOPES

| FLR1: | FORMAT LINE REGISTER #1 | | |
|---|---|---|---|
| BIT | NAME | FUNCTION | NOTES |
| 15 | SODF | START OF DATA FILE = 1 | 1 |
| 14 | EODF | END OF DATA FILE = 1 | |
| 13 | -- | SPARE = 0 | |
| 12 | -- | SPARE = 0 | |
| 11 | SFC3 | SUBFILE COUNTER | 2 |
| 10 | SFC2 | | |
| 9 | SFC1 | | |
| 8 | SFC0 | SUBFILE (COUNTER) INITIAL VALUE | 3 |
| 7 | SIV3 | | |
| 6 | SIV2 | | |
| 5 | SIV1 | | |
| 4 | SIV0 | | |
| 3 | FC19 | MSB ⎫ VIDEO FIELD COUNTER HIGH 4 BITS | |
| 2 | FC18 | | |
| 1 | FC17 | | |
| 0 | FC16 | | |

| FLR2: | FORMAT LINE REGISTER #2 | | |
|---|---|---|---|
| BIT | NAME | FUNCTION | NOTES |
| 15 | FC15 | | |
| 14 | FC14 | | |
| 13 | FC13 | | |
| 12 | FC12 | | |
| 11 | FC11 | | |
| 10 | FC10 | | |
| 9 | FC9 | | |
| 8 | FC8 | ⎫ VIDEO FIELD COUNTER LOW 16 BITS | |
| 7 | FC7 | | |
| 6 | FC6 | | |
| 5 | FC5 | | |
| 4 | FC4 | | |
| 3 | FC3 | | |
| 2 | FC2 | | |
| 1 | FC1 | | 4 |
| 0 | FC0 | LSB | |

NOTE 1: For data files containing a single encoding envelope, SODF and EODF will both be set.
NOTE 2: SFCi provides subfile identification and functions as a countdown indicator of the remaining subfiles within the data file. SFCi is loaded with the value of SIVi at SODF=1.
NOTE 3: SIVi defines the number of encoding envelope subfiles (fields) in a data file.
For SIVi=0H: 1 data file = 1 encoding envelope.
For SIVi=FH: 1 data file = 16 encoding envelopes.
NOTE 4: FC1 is video frame synchronized so that FC1 is odd for the first field within a video frame.

FORMAT LINE REGISTERS

Fig. 12

EXTRACTING DIGITAL DATA FROM A BUS AND MULTIPLEXING IT WITH A VIDEO SIGNAL

RIGHTS OF THE GOVERNMENT

The invention described herein may be manufactured and used by or for the Government of the United States for all governmental purposes without the payment of any royalty.

BACKGROUND OF THE INVENTION

The present invention relates generally to television with signal formatting for providing more than one information signal in the same channel during sync or blanking intervals; and more particularly to a system for monitoring a digital data bus, selecting data, and encoding it for multiplexing with a video signal. The particular system provides digital capability for cockpit television instrumentation systems using a video recorder.

There are now a number of systems for dissemination of data in digital form along with a television signal, e.g., during the vertical blanking interval, so that information other than the video signal can be included in the same channel.

For example, U.S. Pat. No. 4,218,697 to Leventer discloses a digital logic circuit for digital encoding and decoding of information, which encoding is performed on a standard TV video signal. U.S. Pat. No. 4,335,402 to Holmes discloses a teletext system which transmits auxilliary information before the vertical sync pulse in the vertical blanking interval to avoid interference to the normal transmitted picture. U.S. Pat. No. 4,380,027 to Leventer et al discloses a video data encoding system for encoding digital data to be transmitted by way of scan lines of a television video signal. U.S. Pat. No. 4,308,588 to Hernandez et al discloses a circuit for arranging video data in a block format.

Video instrumentation systems are being used in an increasing number of airborne applications such as replacement of the traditional film gun camera. There is a wide range of digital instrumentation requirements for flight testing, dry-run gunnery scoring, combat/mission documentation, operational training, and the inflight collection of maintenance data.

In any airborne instrumentation application requiring the recording of both image data and digital data, the ability to use one recorder for both data types could provide several advantages. The advantages include reduced instrumentation volume and the synchronization of digital and image data. The electronics necessary to multiplex the digital and image data for instrumentation could easily achieve volume/cost/reliability advantages over the alternate approach of separate digital and video instrumentation systems.

SUMMARY OF THE INVENTION

An object of the invention is to provide a system which allows a portion (or all) of the recording bandwidth of a video instrumentation system to be allocated to the recording of digital data.

According to the invention, a television video data instrumentation recording system incorporates a digital data recording capability within the normal video signal recording process while allowing for later digital data recovery during video playback. The digital data is acquired from a MIL STD 1553B Multiplex Serial Data Bus which is normally an asynchronously polled system for exchanging data messages between a bus master device and multiple slave devices where each slave device has a unique device identification code for its messages. Under this approach, data acquisition is a passive function (relative to the 1553B Multiplex Bus) involving the hardware programmable selection of messages of interest (based on the message device code) and the software programmable deletion of messages that contain no data of interest. Another feature of data acquisition is that a time reference for time-of-acquisition is appended to the acquired messages of interest. This approach also intercepts the video signal between the television source and the recording system, programmably assembles the acquired data messages into recording data blocks synchronized to the video signal, and performs a formatted serial encoding conversion of the data blocks into a "black-field" video signal with the data block encoded as "black-white" luminance excursions. This encoding conversion includes a hardware appended time reference video-time-of-recording as well as programmable hardware formatting information that supports variable-size message block encoding as well as fault tolerant digital data recovery during replay of the video recorder. The output video signal to the recording system is generated by programmably switching back and forth between the source video and the synchronized encoded "black-field" video so that the individual horizontal raster lines of luminance encoding are substituted for lines of the original video. This substitution would normally occur in (but is not limited to) the normally-blanked (unused) horizontal rasters contained in the vertical blanking interval of the video signal. Once recorded, the video signal (with embedded digital data) can be played back with programmably selected portions of the video subjected to a decoding conversion with extensive hardware error checking that recovers the formatting information and data such that the original acquired 1553B data messages (and time tag) can be reconstructed with minimum data loss due to recovery errors. This approach can also be used with any device addressable serial data bus.

The primary novel features of this invention are:

A. Passive data acquisition with programmable data selection to fit within the video bandwidth allocated for digital recording.

B. The programmability of the video encoding format structure that allows the data acquisition process to be loosely coupled to the encoding process. This feature includes the appending of separate time tags for time-of-recording as well as time-of-acquisition. This feature also allows static and/or dynamic determination of the video encoding "packing factors" relative to the data acquisition parameters.

C. The video encoding format structure that supports fault tolerant data recovery so that individual datum recovery errors have a minimum chance of propagating errors into adjoining data.

D. The ability to continue to generate encoded video with recoverable data even though source video instability (or total loss of signal) results in the loss of the video image data. This feature includes provision for minimizing recovery time after restoration of the source video.

The video encoder uses manchester format, which may be defined broadly as encoding in which the shift clock reference is embedded into the shifted data waveform.

REPORT AND DESIGN DETAILS

The prototype system is described in a report AFW-AL-TR-83-1156 titled "Digital Capability for Cockpit Television Sensor Instrumentation Systems" by D. O. Hague, Jr., November 1983, a copy of which is on file with the application. The details of hardware/software design can be obtained as noted on page 7 of said report. Copies of the engineering drawings and software listings of critical units of the prototype system are also on file with the application.

BRIEF DESCRIPTION OF THE DRAWING

FIG. 8 is a block diagram of the video decoder shown in FIG. 2;

FIG. 9 is a timing diagram showing the word encoding format with three examples;

FIG. 10 is a chart showing the command cell format;

FIG. 12 is a chart showing format line registers.

DETAILED DESCRIPTION

I. INTRODUCTION

Cockpit Television Sensor (CTVS) instrumentation systems which comprise a video camera and a video cassette recorder have been developed and are now in use. Prior experimental systems for multiplexing digital data into a CTVS instrumentation system without loss of image data have been relatively successful. There is a plan to use CTVS technology in the replacement of the traditional fighter aircraft gun camera. There is also increasing use of the MIL STD 1553B Multiplex Serial Data Bus as the communications link between avionics systems and/or subsystems.

The concept of the present invention is that of a "Black Box" electronics assembly that provides digital recording capability for a CTVS instrumentation system designed for airborne applications. This "Black Box" has two functions, (1) "monitor" the Multiplex Bus for digital instrumentation data, and (2) multiplex (or "video-encode") the acquired digital data into the video signal from the video camera for recording on the video cassette recorder. This "Black Box", which acts as the instrumentation "bridge" between the CTVS and Multiplex Bus technologies, is designated as a Bus-Monitor/Video-Encoder, and is hereinafter referred to as BM/VE.

The BM/VE concept has three attributes, (1) passive acquisition of all message traffic on the 1553B Multiplex Bus to remove instrumentation software task loading from the real-time avionic equipment, (2) programmable hardware/software message selection based on the device address field embedded within the messages (and/or message types) with message-acquisition time-tagging, and (3) synchronization, formatting, and luminance encoding of the selected data messages for multiplex insertion into the unused horizontal scan lines of the video signal. The second attribute is critical, since only about 5% of the video signal can be used for encoding digital data without loss of image data. Also, since the 1553 Bus operates in an asynchrouously polled mode, typically 30–50% of the message traffic is non-data overhead.

II. SYSTEM

Figure 1:
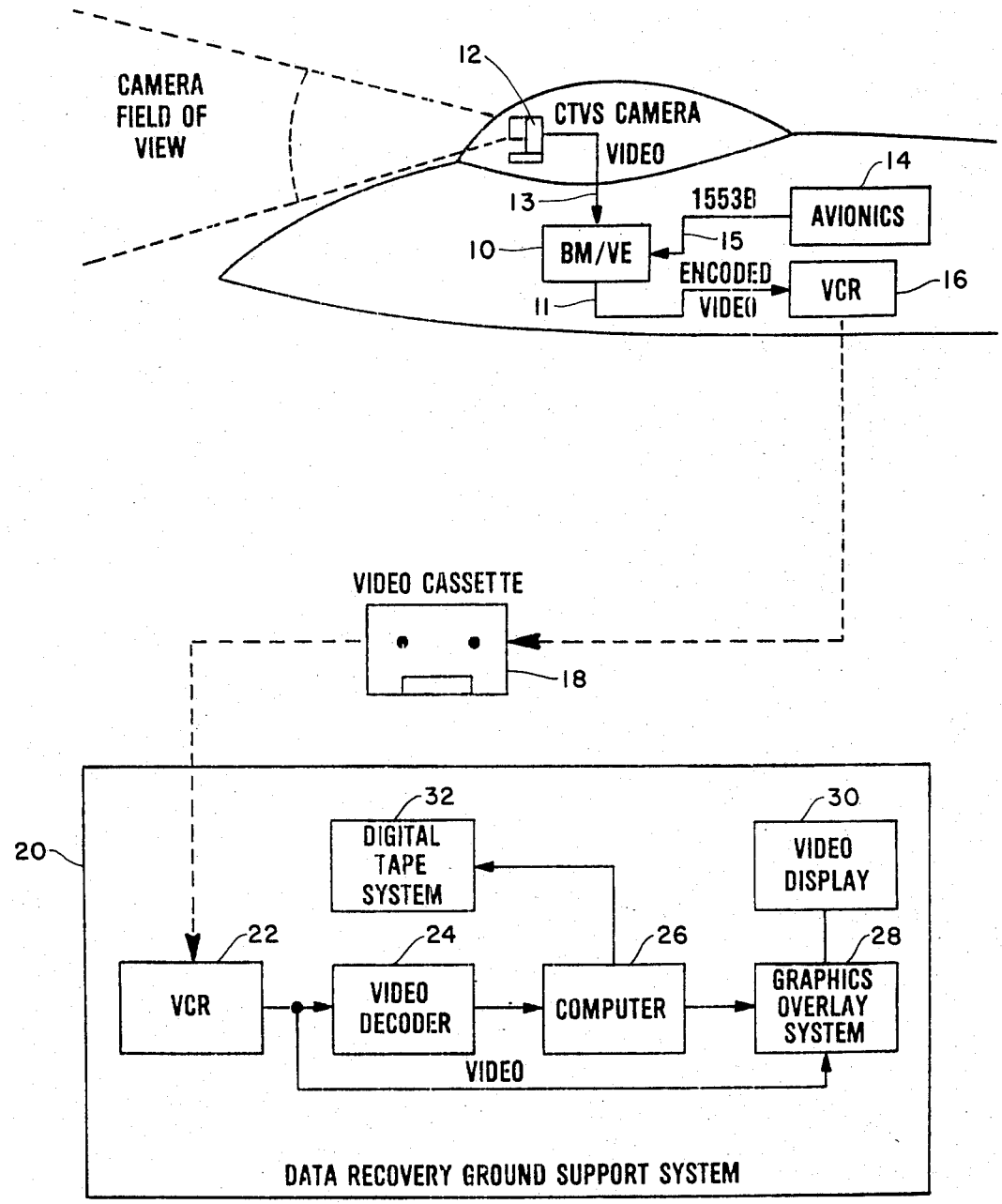
FIG. 1 is a system block diagram showing a typical application of the Bus Monitor/Video Encoder (BM/VE) concept.

A possible application of the BM/VE concept is shown in FIG. 1. The airborne equipment comprises the BM/VE unit 10, which has a video input from a CTVS video camera 12 via a line 13, and another input from the avionics equipment 14 via the 1553B bus 15. The output from the BM/VE unit is via a line 11 to a video cassette recorder 16. The digital data acquired from the 1553B Bus might include flight-profile data, various target sensor tracking data, and weapons control data such as gun-trigger flags. The video cassette 18 would then be removed from the aircraft for post-flight processing on an Aerospace Ground Equipment computer support system 20.

The data recovery ground support system 20 comprises a video cassette recorder 22, a video decoder 24, a computer 26, a graphics display overlay system 28, a video display unit 30, and a digital tape system 32. The functions performed by the support system could include recovery, quick-look display, and archival storage of the digital data. Another function might be the display of video image data overlaid with alphanumeric/symbol status information for evaluation purposes during pilot debriefing. Since the digital data acquisition function of the BM/VE concept is fully programmable, a standardized hardware version of the BM/VE concept could be adapted to a wide range of digital instrumentation requirements. This adaptation could be as simple as plugging in an "application-pack" of read-only-memory containing data-acquisition software parameters. The BM/VE concept in conjunction with CTVS systems can meet digital/video instrumentation requirements in flight-testing, dry-fire gunnery scoring, combat/mission documentation, operational training, and the in-flight collection of maintenance data. Given the pre-existence of a CTVS instrumentation system, the BM/VE concept can meet digital recording requirements for a wide range of applications as a cost/space-effective alternative to separate digital instrumentation systems.

Registered trademarks of the Digital Equipment Corporation (DEC) for components of the system are: PDP, RSX, UNIBUS, QBUS, LSI-11.

II-1. BUS-MONITOR/VIDEO-ENCODER UNIT

Figure 2:
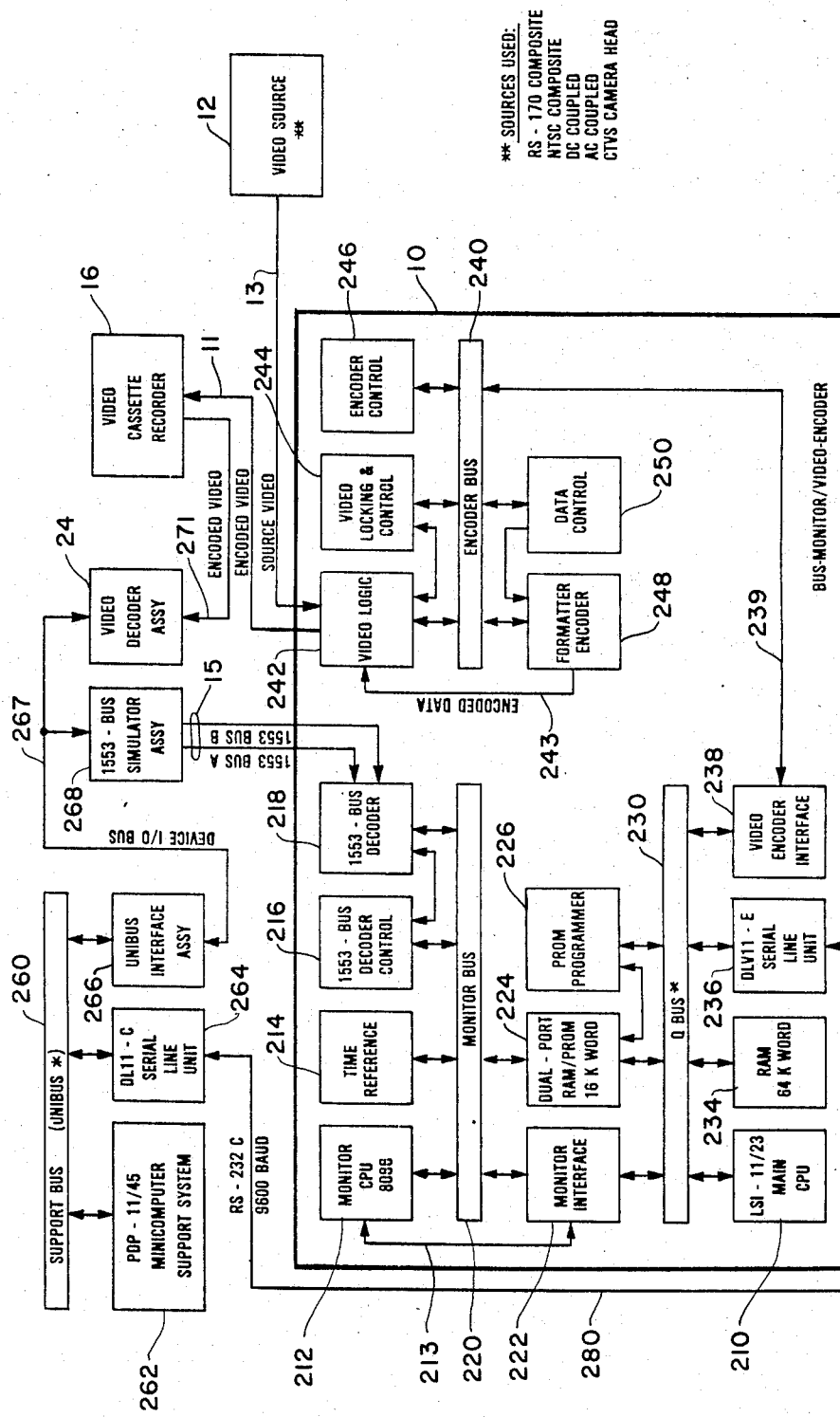
FIG. 2 is a system block diagram of a BM/VE system, which is part of the airborne equipment of FIG. 1, and of the protype support system.

A block diagram of the constructed prototype of the BM/VE unit 10 is shown in FIG. 2. The bus monitor (BM) portion comprises a monitor bus 220, a Q bus 230, a main CPU 210, a monitor CPU 212, a time reference unit 214, a 1553-bus decoder control unit 216, a 1553-bus decoder 218, a monitor interface 222, a dual-port RAM/PROM memory unit 224, a PROM programmer 226, a RAM memory 234, a serial line unit (DLV11-E)

236, and a video encoder interface 238. The video encoder (VE) portion comprises an encoder bus 240 a video logic unit 242, a video locking & control unit 244, an encoder control unit 246, a formatter encoder 248, and a data control unit 250. The serial line unit 236 and PROM programmer 226 provide support functions for prototype development that would be unnecessary in actual unit applications.

A Digital Equipment Corporation Microprocessor (LSI-11/23) is used as the main central processing unit (CPU) 210. This microprocessor 210 is the direct controller of the video-encoder interface assembly 238 and the indirect controller of the bus-monitor interface assembly 222. Direct control of the data acquisition function is accomplished by the slave CPU 212 embedded into the bus-monitor interface 222. This slave or monitor CPU 212 is an Intel Microprocessor (type 8086). The particuler microprocessors used as CPUs 210 & 212 can readily be replaced with equivalent microprocessors without affecting the critical portions of this invention. The main CPU 210 has over-ride mode-control and access to the monitor CPU 212 and the monitor bus 220. The main and monitor CPUs 210 & 212 have program interrupt cross-linkage and also share a memory common via a dual-port RAM/PROM (random acess memory/programmable read only memory) interface 224. The main CPU 210 uses this dual-port RAM/PROM 224 to provide the monitor CPU 212 with task programs and to access the acquired data. The main CPU 210 also has an on-line PROM programmer interface 226 for permanent entry of monitor CPU subroutine programs. The program tasks performed by the main CPU 210 are:

a. Gaining and holding synchronization with the external video source via the video locking and control functions of the video-encoder interface.

b. Oversight of the bus-monitor operations and the interchange of empty and full memory data buffers for acquired 1553B message data blocks.

c. Synchronization and queuing of the full 1553B message data blocks to the encoding function of the video-encoder interface.

d. Exception handling and error recovery for the bus-monitor and video-encoder interfaces. Execution of tasks a through c must be real-time. Task d may or may not be real-time depending on what exception or error occurs, but it must restore real-time operation.

The bus-monitor subassembly performs the actual data acquisition from a dual-channel 1553B multiplex bus 15 under direct control of the Monitor CPU 212. The decoder 218 and decoder control 216 interfaces receive all 1553B traffic and perform hardware message grouping of the serial data word transmission sequence. It should be noted that we used the Instrumentation Bit Option of MIL STD 1553B (Para. 4.3.3.5.3.4) which is also used in the F-16 applications. This option allows simpler hardware message grouping and message-grouping-error recovery within two messages. Without this option, hardware message grouping is slightly more complex and error recovery could not be made until a 30 microsecond gap in serial activity was detected after error occurrence. As each serial message is received, the Terminal Identification Field from the message control word is tested against a programmable look-up table to identify message treatment. If enabled, the entire message is loaded into a First-In-First-Out (FIFO) buffer and the Monitor CPU is notified of an end-of-message. The FIFO buffer can hold at least 1.6 milliseconds of 1553B activity and allows averaging of the Monitor CPU load. Based on end-of-message, the Monitor CPU 212 deletes error-free non-data messages, time-tags data messages, and assembles data messages into the message block buffers supplied by the main CPU 210.

The Video-Encoder subassembly performs two interrelated functions under direct control of the main CPU 210. The first function is to synchronize (or GEN-Lock) the internal video timing generator to the external video source. The GEN-Locked video timing generator provides the timing references for all Video-Encoder activity. The second function is the generation and insertion of the encoded-data signal into the source video for output from the BM/VE. This encoded-data signal includes hardware generated formatting information as well as 1553B data words from the Bus-Monitor Interface.

Operation of the BM/VE prototype is supported by a Digital Equipment Corporation Minicomputer 262 (PDP-11/45), which has access to a support bus 260 (UNIBUS). Other support equipment includes a serial line unit 264 (DL11-C), a support bus interface assembly 266, a bus simulator assembly 268, and a video decoder assembly 24. The support minicomputer 262 provides three separate support functions to the BM/VE. In the first function, it emulates a "Console Terminal" to the main CPU 210 to provide down-line program loading and control/status communications via an RS-232 serial data link 280. The second function is the real-time control of the 1553-Bus simulator assembly 268 which includes providing the control-data files that result in the dual-channel 1553 Multiplex Bus input to the Bus-Monitor Interface 222. The third function is real-time control of the video-decoder assembly which is used for testing the data recovery/reliability parameters of the BM/VE.

II-2. MIL STD 1553B BUS SIMULATOR ASSEMBLY

Figure 3:
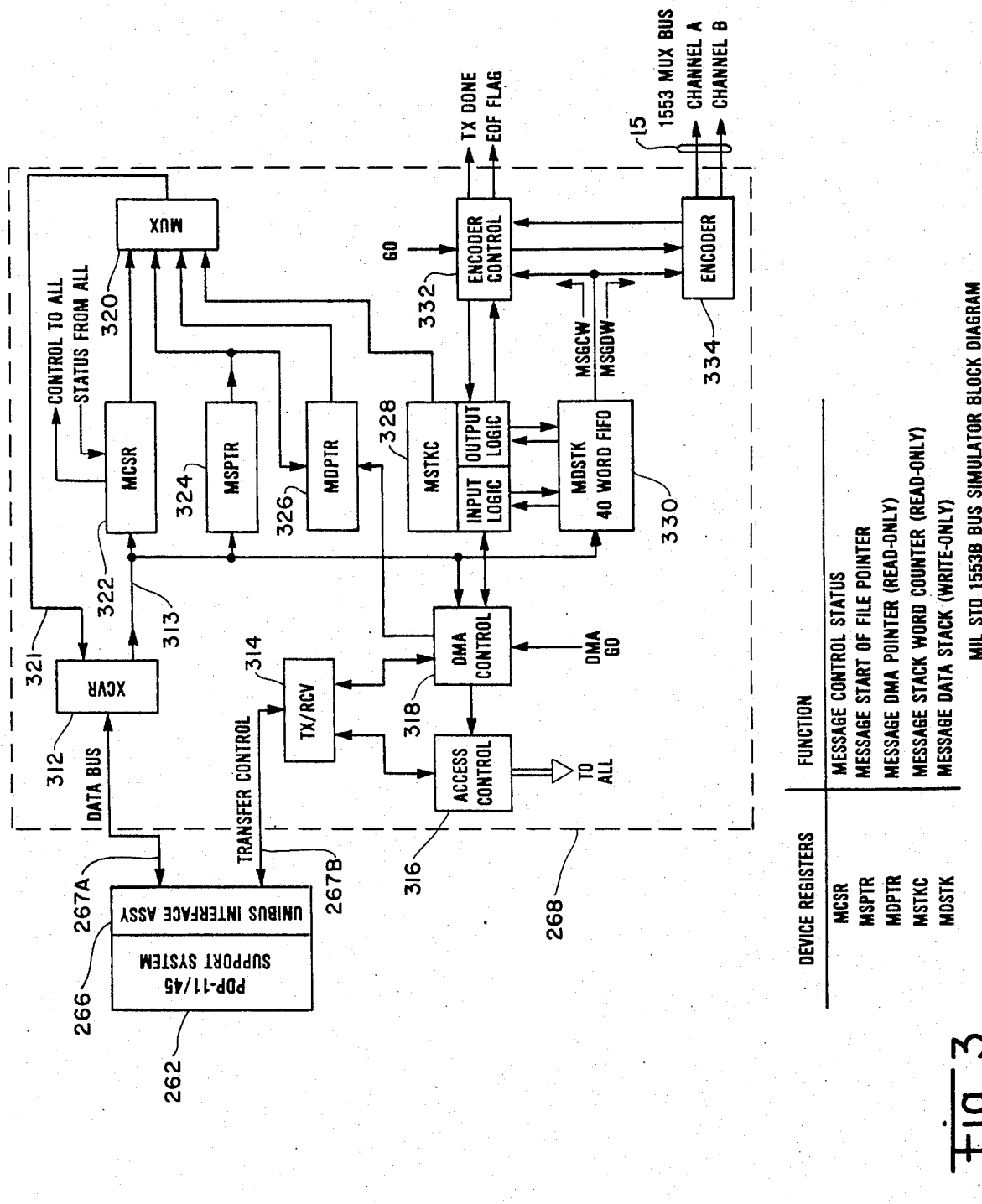
FIG. 3 is a block diagram of the 1553B bus simulator shown in FIG. 2.

A block diagram of the bus simulator assembly 268 is shown in FIG. 3. It includes five device registers, which are a message control status register 322, a message start of file pointer 324, a message direct memory access pointer 326 (read only), a message stack word counter 328 (read only), and a message data stack 330 (write only). The data stack 330 is a 40-word first-in-first-out register. Unit 268 also includes a transceiver 312 and a transmit/receive control circuit 314 coupled via line 267 (data bus 267A & transfer control line 267 B) to the support bus interface assembly 266. The control also includes an access control circuit 316 and a direct-memory-access control circuit 318. A multiplex circuit 320 couples output of four registers 322-328 to the transceiver 312. An encoder control circuit 332 controls an encoder 334, which supplies data to the multiplex bus 15.

The bus simulator 268 (FIG. 3) generates a simulated 1553B Bus profile by sequentially processing a data file of word pairs provided by the support system. Each word pair contains a Message Data Word (MSGDW) and a Message Control Word (MSGCW). The MSGDW word provides the encoder with the data bits for actual transmission. The MSGCW word provides the encoder control with the transmission parameters. These parameters include channel select, transmission type, the delay to next transmission (0-4 milliseconds), control bits for forcing transmission errors, and End-Of- File flag. The three transmission modes of the Bus Simulator are the Program Control Mode, the DMA Mode, and the DMA Loop Mode. In the Program Control Mode, the support minicomputer 262 preloads the Message Data Stack (MDSTK) with up to 20 MSGDW/MSGCW word pairs and issues a GO command. The contents of MDSTK are then transmitted over the 1553B Bus. In the DMA Mode, MDSTK is incrementally loaded from a Start-Of-File Pointer via direct memory access to main memory in the PDP-11/45 until the end-of-file flag is detected in a MSGCW data word. The device-busy then terminates after transmission of the word pair containing the end-of-file flag. In the DMA Loop Mode, when the DMA logic detects an end-of-file flag, the DMA Pointer is reset to the start-of-file pointer. In the Loop Mode, the data file transmission is automatically repeated until the support minicomputer exercises over-ride control.

Two support software programs were developed for the Bus Simulator. The first program generates the message data files based on operator inputs of the desired 1553B Bus profile. The second program provides the device driver software and the real-time control and message transmission scheduling required to achieve accurate 1553B Bus simulation. Since all transmission parameters were programmable, worst case and typical case profiles could be generated for burst-data-rate, average-data-rate, message types, 1553B terminal count, and transmission errors.

II-3. BUS-MONITOR INTERFACE ASSEMBLY

Figure 4:
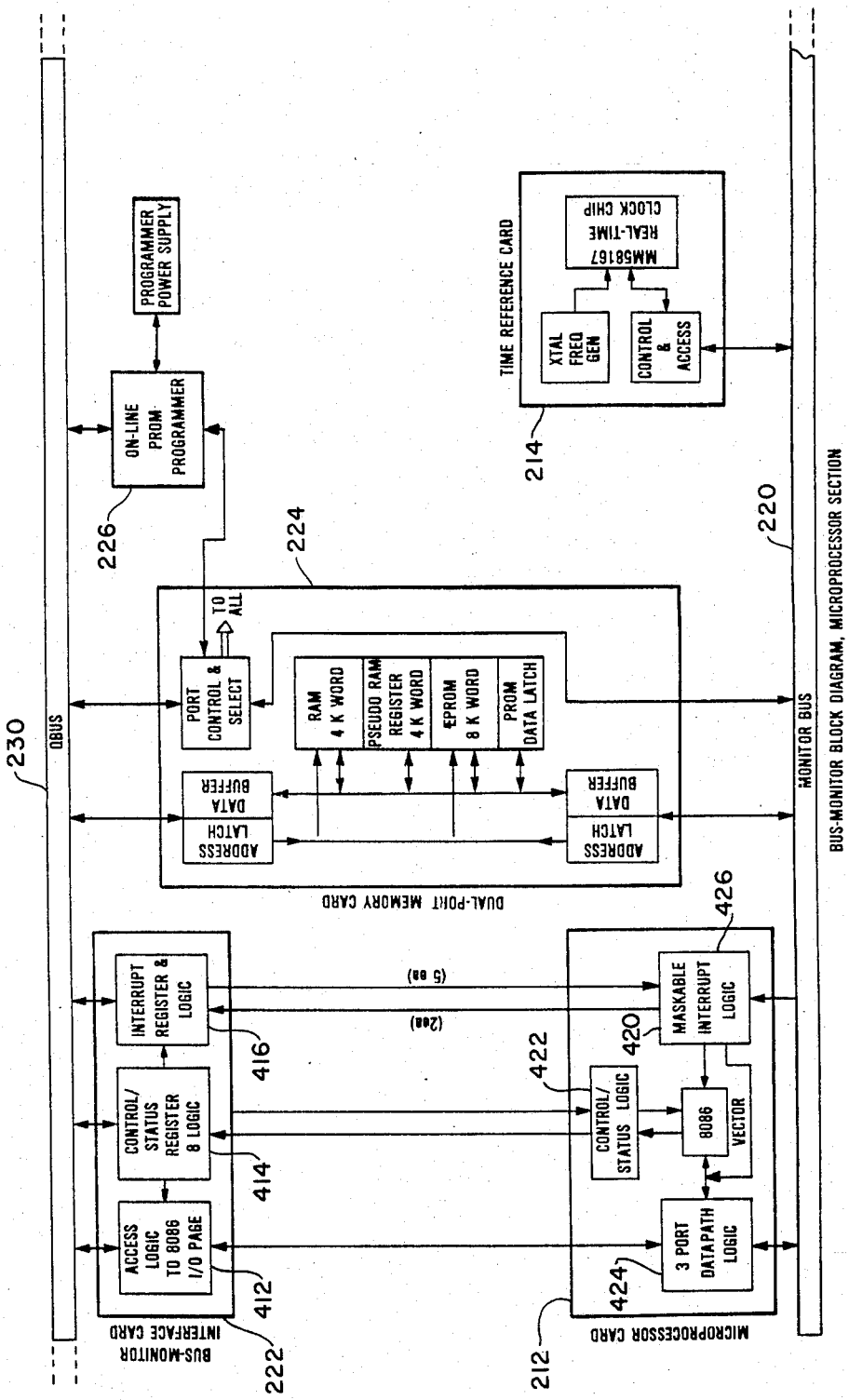
FIG. 4 is a block diagram of the microprocessor section of the bus monitor part of the BM/VE unit.
Figure 5:
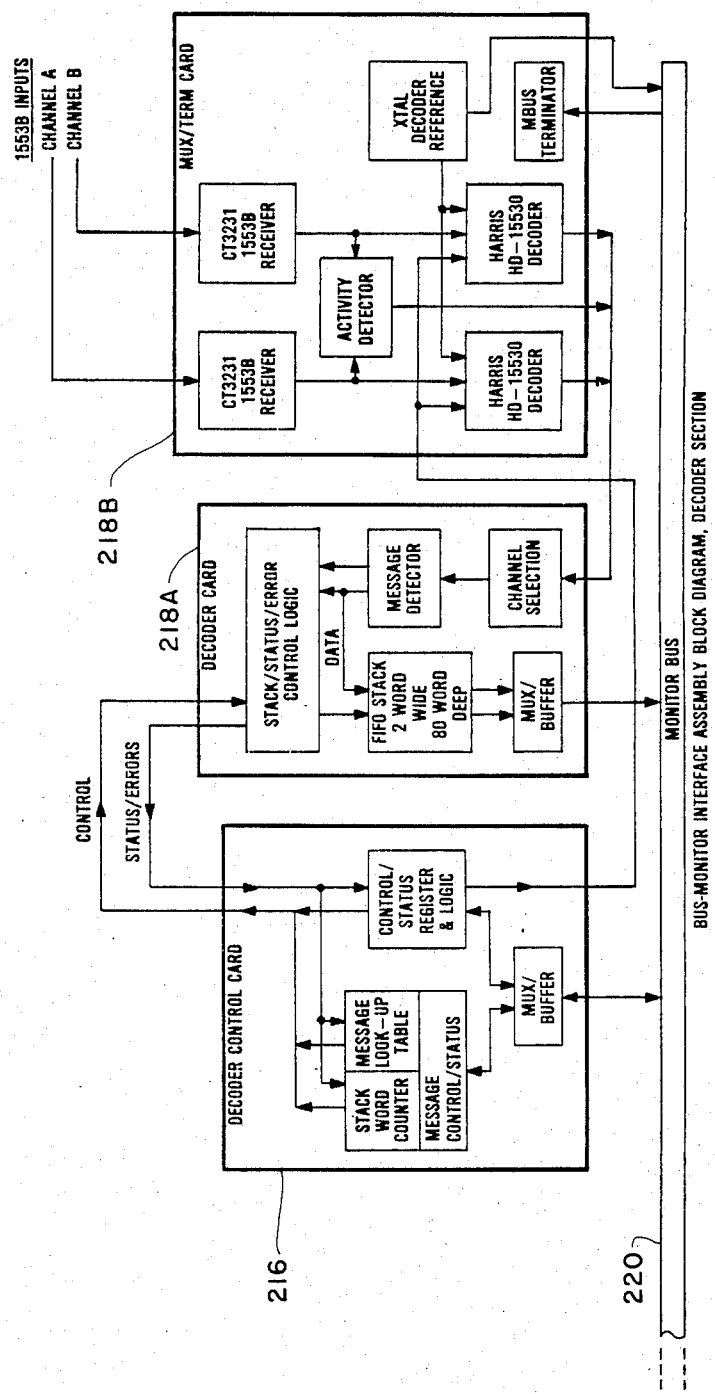
FIG. 5 is a block diagram of the interface assembly, decoder section, of the bus monitor part of the BM/VE unit.

The Bus-Monitor Interface consists of the microprocessor section (block diagram shown in FIG. 4) and the decoder section (block diagram shown in FIG. 5). The microprocessor section (FIG. 4) comprises the microprocessor card 212, the bus monitor interface card 222, the dual-port memory card 224, the time reference card 214, and the PROM programmer 226. The decoder section (FIG. 5) comprises the decoder control card 216, and the multiplex bus decoder 218 which is divided into a decoder card 218A and a multiplex terminal card 218B.

From the hardware point-of-view, the Bus-Monitor (BM) is an independent CPU system once it has been initialized by the main CPU 210. While the main CPU 210 does have over-ride control of the Monitor CPU 212, program task synchronization between the main and monitor CPUs 210 & 212 is normally a software function achieved through use of program interrupt cross-linkage and/or the use of flag words in common memory. The monitor CPU 212 communicates with the other Bus-Monitor components over the Monitor bus structure 220 which is very similar to the QBUS 220 (except for the interrupt structure). To the main CPU 210, the Bus-Monitor appears to be a contiguous block of 256 registers located in the "Bank 7" Peripheral Device address region. The lower 254 register addresses form a window into the monitor CPU I/O device range while the other two register addresses are used as an monitor CPU control/status register and an interrupt linkage control register. The control/status register provides reset/go control and the ability for the main CPU 210 to take over-ride access control of the monitor CPU I/O page. The control/status register 414 is also the source of two maskable interrupts to the main CPU 210, one interrupt for the monitor CPU 212 stopped and one interrupt for an access error (either monitor CPU 212 monitor bus time-out or improper main CPU 210 access of the monitor CPU I/O page). The interrupt linkage register 416 allows the main CPU to assert four maskable interrupts and one non-maskable interrupt to the monitor CPU. The interrupt register 416 is also the source of two maskable interrupts to the main CPU that are asserted by monitor CPU software. This interrupt cross-linkage forms the basis of real-time synchronization between the main and monitor CPUs.

The Bus-Monitor microprocessor card contains the 8086 CPU 420, control/status logic 422, data path logic 424, and 8086 interrupt logic 426. The interrupt logic provides vectored interrupts to the 8086 based on four request lines from the main CPU 210 and four request lines (one spare) from the monitor bus 220. A fault vector is also used to provide for the case of main CPU actions clearing the request before the monitor CPU 212 can respond to the request. This logic also "ORs" the Non-maskable Interrupt from the main CPU 210 (normally used only for over-ride purposes) with a Monitor Bus Access-Time-Out error condition. The interrupt logic also provides a 2-bit write-only register at the top of monitor CPU I/O space that allows the monitor CPU to set either of two interrupt requests to the main CPU.

The second communication channel between the main CPU and the monitor CPU is a 16K word dual-port memory card 224. This card contains 4K Words of RAM, 4K Words of Pseudo RAM (a 16-Bit register that responds to a 4K address range), and 8K Words of EPROM. This memory is normally initialized with the monitor CPU program as part of the main CPU bootstrap operation. The RAM is normally used for the monitor CPU vector table, a monitor CPU task scheduler, and as data common. As various data acquisition tasks were developed and debugged in the RAM, these tasks would then be relocated into the EPROM memory via use of the On-Line PROM Programmer 226.

The time reference card 214 uses a National Semiconductor MM58167 real-time clock to provide millisecond accuracy time tagging of acquired data from the multiplex bus 15. This time reference can be "slaved" to any IRIG time data that appears on the 1553B Bus. This card can also provide a time-interval interrupt to the monitor CPU.

The decoder section (FIG. 5) performs the actual data acquisition under control of the monitor CPU program. This section consists of the decoder control card 216, the decoder card 218A, and the MUX/TERM card 218B. The MUX/TERM card receives inputs from two 1553B channels and converts each data channel into serial NRZ data signals and associated status information. This card also provides channel activity detectors that allow the decoder card to perform channel selection. The activity detectors operate on the input to the Harris 1553 decoder chips which have an input-to-output delay of about 5 microseconds. This delay allows the Decoder Card channel selection logic enough time to operate. The MUX/TERM Card also provides resistive termination for the monitor bus as well as various crystal clock references for the Bus-Monitor Interface Assembly.

The decoder control card 216 is a two-register device that controls the decoder card 218A to achieve the Bus-Monitor functions. These controls include Decoder-enable, individual channel enable/resets, and a 32-bit look-up table that provides individual enable/disables for FIFO data stack entry of messages based on the Terminal ID number of a message. The Decoder Control Card also provides status signals such as "loaded-word-count" for the FIFO data stack, channel A/B raw activity, enabled-message-busy (receipt in progress), and fatal errors that clear the Decoder-enable. These fatal errors are Monitor Time-out (i.e., 100 milliseconds without receipt of an enabled message), simultaneous activity on both 1553 channels, and data stack overflow. This card also provides an error interrupt and an "end of enabled message" interrupt to the monitor CPU 212.

The decoder card 218A performs the actual data acquisition/selection. Inputs from Channel A or Channel B are selected on a first-come-first-served basis. Once a channel is selected, any activity on the other channel is treated as a fatal error that terminates monitoring operations pending a software restart. The selected channel activity is then grouped into messages based on logical detection of start-of-message and end-of-message. Start-of-message is defined as the first word in an activity envelope having the command/status sync preamble waveform with the Instrumentation Bit=1 (F-16 Option). At start-of-message the terminal address field (5 bits) of the received word is latched as a group message identifier. This group identifier is used to select an enable/disable bit from the Message Look-Up Table (decoder control card) If enabled, all received words for the message are loaded into the FIFO data stack for recovery by the monitor CPU 212. This stack is two words wide and 80 words deep. Each enabled-received word is loaded into the stack at the same time as a decoding-status word. The monitor CPU 212 removes data from the stack in word pairs of decoding status and then decoded data (which automatically pops the stack). This decoding status word contains a group message ID and flags for start-of-message, end-of-message, channel source, word preamble sync type, parity error, and message format error. End-of-message is based on receiving a 1553 status word (i.e., command/status preamble and Instrumentation Bit=0) with a terminal ID matching the group ID combined with termination of channel activity. End-of-message will also be forced by detection of a message format error. A message format error is declared when a start-of-message is followed by:

A parity error in any command/status word
Detection of second start-of-message
Detection of a channel change within the message
Detection of 24 microseconds of channel inactivity The occurrence of a message format error loads a pseudo-word-pair (only error bits valid) into the stack and the message detector returns to looking for a start-of-message.

II-4. VIDEO-ENCODER INTERFACE ASSEMBLY

Figure 6:
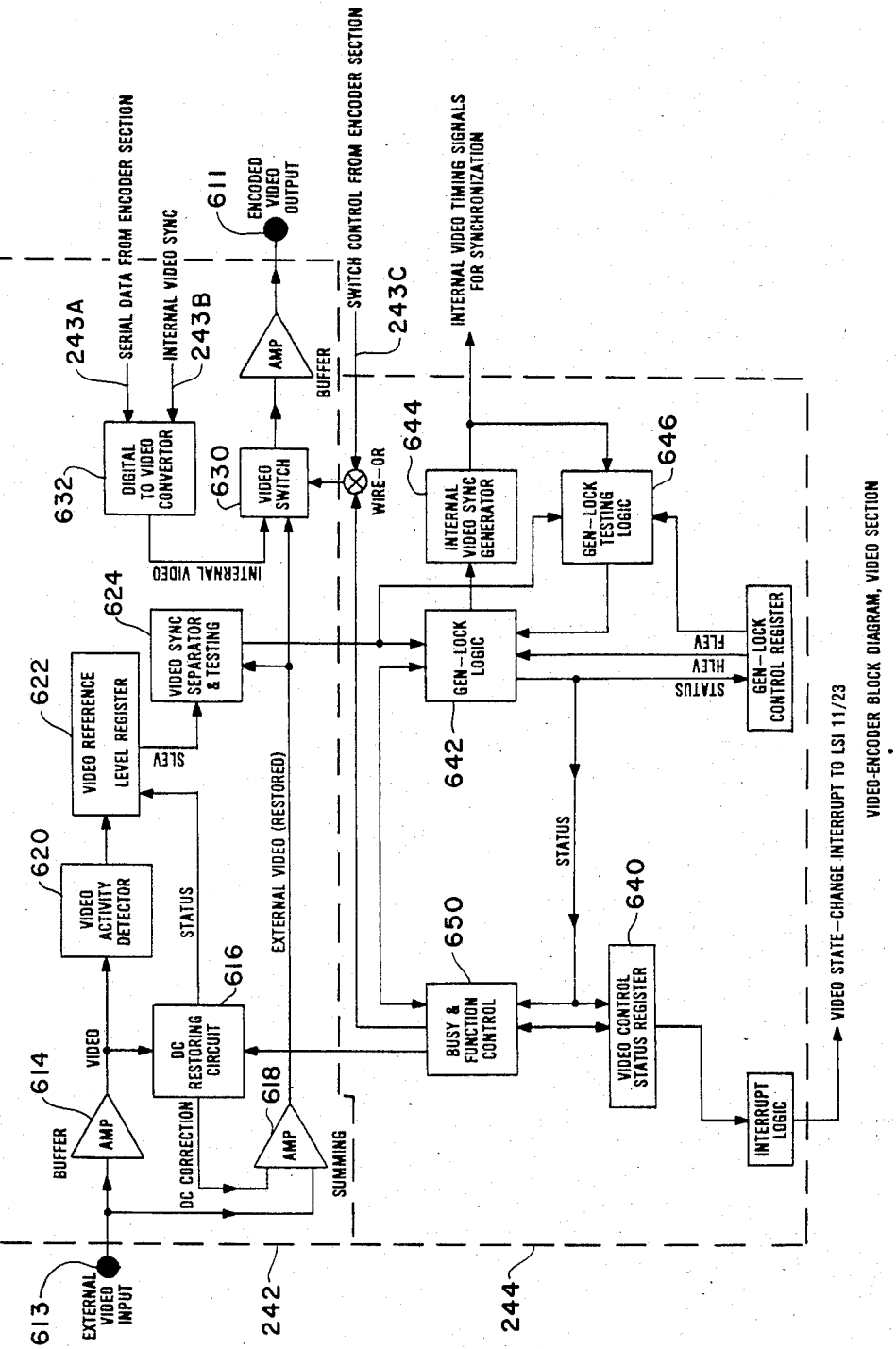
FIG. 6 is a block diagram of the video section of the bus video-encoder part of the BM/VE unit.
Figure 7:
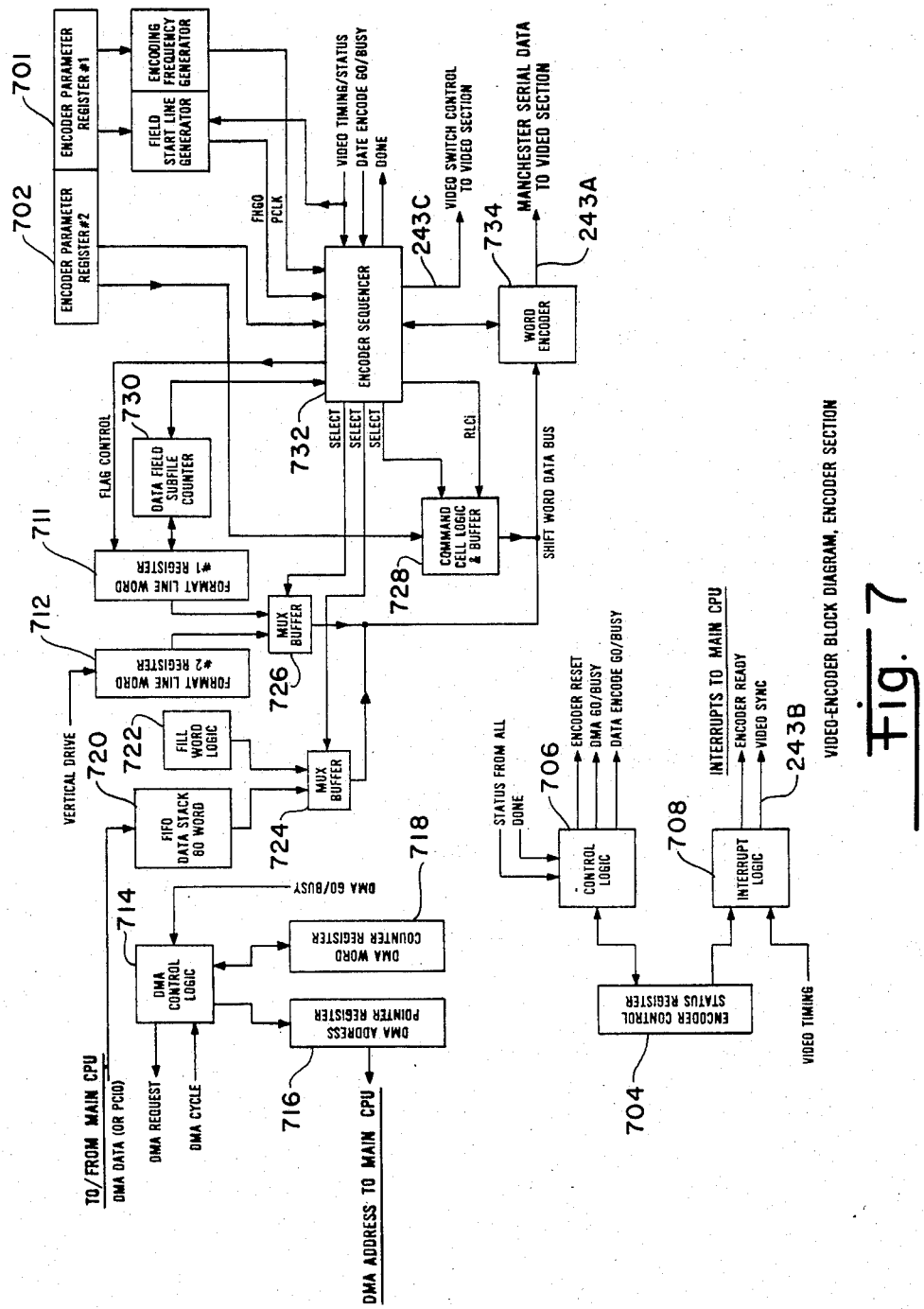
FIG. 7 is a block diagram of the encoder section of the video-encoder part of the BM/VE unit.

The Video-Encoder Interface consists of the Video Section (block diagram shown in FIG. 6) and the Encoder Section (block diagram shown in FIG. 7). The Video-Encoder is under the control of CPU 210 via the QBUS 230 and the Video Encoder Interface 238 (or QBUS Interface Card). This QBUS Interface Card supports DMA direct memory access and up to 4 interrupt sources and 16 I/O device registers. In addition to the QBUS Interface, the Video-Encoder has a direct-coupled video input 613 from line 13 for the source video signal (RS-170/NTSC 1 volt composite terminated to 75 ohms) and a direct-coupled video output 611 to line 11 for the video with encoded data (RS-170/NTSC 2 volt composite unterminated, 1 volt composite terminated to 75 ohms).

The encoded data consists of a block of contiguous video horizontal line rasters in each video field containing words encoded as back-white luminance excursions in a manchester format. Each horizontal line raster has an internal structure of a command word cell followed by 0-7 data word cells. The command word cell contains status flags, the number of data word cells to follow on the line, and a "line-of-block" identifier. The encoded data block has an additional format structure (overlaid by hardware) in that the first and last raster lines of each encoded block contain two format words with the only difference between these raster lines being the "line-of-block" identifier in the command cell word. The format words provide a video time reference of a 20-bit video-field counter (i.e., 60 hertz) and provisions for defining a "data-file" of 1 to 16 sequential field encoding-data-blocks. The development of this encoding format is discussed in detail in Section III.

To the main CPU 210, the Video-Encoder is a set of 11 read/write registers and the source of 3 maskable program interrupts. Individual register bits may be read/write, read-only, write-only (read zero), read/-conditional-write, or conditional-write-only. All operations of the Video-Encoder are the direct result of main CPU operations. The main CPU 210 performs the task of assembling data file buffers from the Bus-Monitor data acquisition process and issuing these data files along with the appropriate control parameters to the Encoding Section in the real-time sequence defined to the main CPU by the Video Section.

One special function was implemented in a "spare" register address of the Video-Encoder that has no relationship to the encoding function. This function takes the form of a 16-bit read/write register latch with each bit wired to a readily accessible test point. This function was used for software development, testing and measurement. This function was accomplished by the simple expedient of assigning each bit to a particular program task with insertion of bit-set and bit-clear instructions at the task entry and exit points respectively. Thus the register bit forms a task execution envelope at an "over-head" cost of about 3 microseconds for each task which is significantly lower than most other methods of inserting "test-probes" into real-time software. The connection of Logic Analyzers or other test equipment to these register test points allows very precise relative and absolute time measurements of the real time software execution.

The Video-Encoder video section (FIG. 6) is functionally independent of the encoder section (FIG. 7) in that all encoder functions are based on the timing and status outputs of the video section. One of the primary functions of the video section is to GEN-Lock the internal video sync to the external video source under computer control. The other primary function is to incorporate the TTL-level encoding signal from the encoder section into the output video signal. One of the serious problems in incorporating the encoding component into the video signal is the actual coupling technique. Capacitive coupling results in serious bandwidth attenuation of the higher encoding frequencies. Direct coupling avoids the bandwidth problem but requires that the source video be at a known level to avoid serious video distortion that would cause problems for downstream equipment. Also, provision must be made for a video source that uses a capacitive-coupled output which will have DC component that varies with the average luminance level of the signal. Even a direct-coupled video source may have a DC offset due to relative grounding differential. The technique used to solve this problem was to use direct-coupling and to buffer the input into two channels. The first channel is a unity amplifier 614 that is the input to DC Restoring Circuits 616 that provide an offset correction to the second channel summing amplifier 618 which thus normalizes the video source to local ground. The DC Restoring Circuitry operates by sampling and filtering the level of successive sync tips. The restored video signal is routed to a video switch 630 (discussed later) and the sync separator logic 624. The sync is separated from the restored external video by a comparator with a second input of sync-level (SLEV) which is the digital-to-analog conversion of a 6-bit programmable parameter. This allows a software algorithm the ability to autocalibrate for optimum GEN-Lock. A coarse horizontal stability test is also performed to determine if GEN-Lock should be attempted.

Control of the video section is primarily achieved by the software through the Video Control/Status Register 640. This register provides the ability to enable/disable the DC Restoring Circuit 616 as well as the Video Switch 630 and to initiate GEN-Lock busy cycles. The criteria for initiating GEN-Lock are that the Video Activity Detector 620 (which is a rate-of-change detector) indicate activity and that the coarse horizontal stability test indicate "stable". When enabled, the GEN-Lock logic 642 derives vertical and horizontal locking "resets" for the internal video sync generator 644 (National Semiconductor MM5321) from the separated external sync. The horizontal locking level (HLEV) was programmable for horizontal locking from every horizontal sync to every 16th horizontal sync. However, it was found that locking every horizontal sync was required. When initiated, the GEN-Lock busy cycle had three phases (normally taking 240 milliseconds) which are frame-lock, horizontal-lock, and lock-test. The lock-test function logic 646 loads a programmable 8-bit fail-lock-level (FLEV) into a counter on each locking reset and uses the Exclusive-Or of external and internal sync to enable a count-down clock. If the counter underflows, GEN-Lock has failed and the locking resets are inhibited until another software initiated GEN-Lock cycle. If the lock-test phase passes, the video section remains in GEN-Lock mode with the lock-test enabled until lock-fail or software lock-release. Another important feature is that the locking resets are "windowed" to limit the lock-tracking-rate to a range acceptable to the encoding process and to down-stream video equipment. The video section also provides a maskable "Video-State-Change" program interrupt to the main CPU 210. A Video-State-Change is defined as completion of a busy cycle or a change in the coarse horizontal stability test or the GEN-Lock mode (e.g., due to lock-fail) when the device is not-busy.

The final functional area of the video section is the video switch 630 which has inputs of the external restored video and the internal video. The internal video is a black-field video signal (which may contain luminance-encoded data) generated from internal video sync and the serial data line from the encoder section by the Digital-to-Video Converter 632 (National Semiconductor LM 1886 and offset-scaling amplifier). The video switch "off" position applies the internal video signal to the output video buffer. When enabled by software and the condition of GEN-Locked, the video switch "on" position applies the external restored video to the output buffer. When the encoder section transmits serial data, it also asserts an over-ride "switch-off" for the period of horizontal rasters containing encoded data. This control logic 650 for the video switch has several important consequences when the source video has scattered periods of unstable video. Two factors contribute to these consequences. The first factor is that, in the general case, downstream video equipment will lose GEN-Lock under the same conditions that the video section will lose GEN-Lock. The second factor is that downstream equipment (particularly VCR's) will regain GEN-Lock faster when subjected to a "step" discontinuity in vertical sync than when subjected to a period of general video instability followed by a return to stability. This is due to vertical sync GEN-Lock being primarily a "servo-loop-lock" function which will ramp-in to a step discontinuity in sync but will phase-lag oscillate on general video instability. When the video section loses GEN-Lock, the downstream equipment sees no sudden change in video stability since the internal black field video will only slowly drift (due to clock error) from GEN-Lock with the last period of stable external video. Also, when the external video stability returns and the software initiates a GEN-Lock cycle, downstream equipment sees the GEN-Lock cycle as a step discontinuity in vertical sync. The first consequence of these conditions is that recoverable data encoding can continue even though unstable external source video causes the loss of image data. The second consequence is that downstream equipment will tend to recover GEN-Lock faster when the video source stability returns.

The encoder section (FIG. 7) of the Video Encoder performs the function of generating the formatted manchester-encoded serial data signal within the timing constraints of the internal video sync and the programmable parameters supplied by software. The programmable parameters fall into two groups (Encoder Parameter Register #1 701 and Register #2 702) that correspond to the two stages of encoder operation. Register 701 (EPR#1) selects a crystal reference frequency (24 or 14.31818 megahertz) and provides a 4-bit crystal divider that results in the encoding "phase-clock" (PCLK=2×data clock). Register 701 also provides an 8-bit value to a within-field horizontal sync downcounter whose underflow count determines the starting-horizontal-raster (FHGO=field horizontal go) for any encoding block. Encoder Parameter Register #2 702 contains the encoder enable/reset bit. With encoder enabled, Register 701 becomes read-only and the doubled format line is encoded in every video field unless the video section is executing the GEN-Lock function busy cycle. Encoder enable can be cleared by the fatal error of the selected encoding frequency being too low to allow encoding of a format line within a horizontal raster interval. Register 702 also contains the two parameter fields (3 bits for data word-count/line and 8 bits for data line count) for controlling the insertion of encoded data raster lines between the two format raster lines. Once the encoder is set up and enabled, the actual data encoding process is controlled by the main CPU 210 primarily through the Encoder Control/Status Register (ECSR)704. ESCR Register 704 provides two maskable interrupts to the main CPU 210. The first interrupt is a selectable video-sync (start-of-field or start-of-frame) that is used to test for completion of any prior data encoding block and to initiate the next data encoding block if a data-output-file is ready. The second interrupt is data-encoding-done. Data is normally provided to the encoder via DMA (direct memory access) loading of a FIFO buffer register 720 but can also be provided by PCIO preloading of the FIFO buffer 720 by the main CPU 210. Data encoding is triggered by the main CPU 210 (after initialization of the DMA address and word counter or after preloading the FIFO) via a "data-encode-go" command to ECSR register 704. The encoder sequencer (which started format line encoding after "encoding-enable") tests for a condition of "data-armed" on the first horizontal sync within each video field in order to determine if data encoding raster lines are to be inserted between the format lines. Data-armed results from data-encode-go and the condition of FIFO stack output data ready (i.e., the FIFO register 720 contains enough data words to encode at least one full data line). As a result, after receiving the video sync interrupt, the main CPU 210 has about 450 microseconds to initialize the data parameters and issue the data-encode-go to ensure that data encoding will occur within that field. If this constraint is not met, the data encoding will be delayed to occur in the next video field.

The encoder sequencer 732 performs the critical function of controlling the data flow sequence to the manchester word encoder as defined by the video timing and the encoding parameters. The sequencer controls various status flags and formatting information within the format raster lines and the command cell word that starts each encoded raster line. The sequencer 732 also provides the video switch control via line 243C to the video section that incorporates the encoding into the output video signal. It should be noted that if the FIFO stack 720 has no data ready when the sequencer selects data, a "fill-word" will be substituted for data. Other than an error condition, this would occur only if the number of words provided for encoding were less than the number of words specified by the encoding parameters. This feature can be used to "hardware-normalize" a varying size data file to a maximum size video encoding envelope.

II-5. VIDEO DECODER INTERFACE ASSEMBLY

A block diagram of the Video Decoder 24 is shown in FIG. 8. This device is a BM/VE support interface that resides on the PDP-11/45 support system 262 via the same Unibus Interface Assembly 266 used by the 1553B Bus Simulator 268. The Video Decoder performs the function of recovering the digital data from the video output of the BM/VE proper. The PDP-11/45 support system 262 sees the Video Decoder 24 as a set of nine device registers and two interrupt request sources with acquired data normally transferred to main (PDP-11/45) memory of the support system 262 by DMA. The two interrupts are selectable video sync (start-of-field or start-of-frame) and assertion of decoder-ready (i.e., data-collection-done). Data recovery by the Video Decoder operates on a per-video-field basis with a raw data structure of a file of word pairs consisting of a hardware-generated status word followed by the actual decoded data word. This status word specifies the actual horizontal raster line decoded and provides seven status flags. Three of these flags are for the hardware decoding errors of Manchester Format Error, Bit Count Error, and Parity Error. The other flags are start-Of-Line, Empty Line, Command Cell, and Line Overflow Error. The Start-Of-Line Flag is only set for the first word cell decoded on an individual raster line. The Empty Line Flag signifies that no encoding preamble syncs were detected on that horizontal raster line and that the following data word is a fill-word inserted by the Video Decoder. The Command Cell Flag is set if the decoded word meets the timing parameters defined for the command cell. The Line Overflow Error Flag is set if the video blanking over-rides a word being decoded, which will normally be due to video time instability. The raw data structure is processed by PDP-11/45 software in the support system 262 acting on the decoding status word and the embedded (encoded) format information in order to complete the data recovery process.

The Video Decoder 24 consists of Frontplane and Backplane subassemblies. The Frontplane provides the computer interfacing functions and provides programmable parameters (and controls) to the Backplane. The Backplane provides the functions of video processing/GEN-Lock, conversion of the manchester encoding to an NRZ format, and the reference clock logic that supports the manchester/NRZ conversion. As a debugging aid, the Backplane multiplexes 854 the Frontplane parameters 830 with Backplane parameter switches 852 which can provide an alternate control source that allows a form of independent operation for the Backplane.

The Video Decoder consists of the following components. Video Decoder access by the Support System 262 is controlled by the Control Transmiter/Receiver 812, the PCIO/DMA Acess Logic 814, the DMA/Interrupt-Request Logic 816, the Data Transceiver 818, the Register Multiplexer 820, and the Data Stack Buffer 822. The support system has Program-Controlled Input/Output (PCIO) access to the Control/Status Register Block 870 and the "decoded" Data Stack Register (DSTKR) 824. Although DSTKR is normlly filled with decoded video data from the NRZ Convertor Logic 838 via Multiplexer 828 and emptied via DMA to the support system as controlled by the Stack Control Logic 826. Support system control of the Video Decoder is achieved via the Control Status Register Block 870 which provides decoding parameters to the Backplane as well as controlling the Decoding Envelope Generator 834 and the Collect Data Logic 836. Signal exchange between Back and Front Planes are buffered by transmitters 830 and 856, receivers 832, and the control multiplexer 854. Backplane components are the Video Level Clamper 868, the Video SYNC/LUM Digitizer 866, GEN-Lock Logic 864, Manchester-to-NRZ Converter 862, Reference Clock Logic 858, and X12 Clock Multipleier 860.

The Video Decoder has three basic stages of operation which are described in the following paragraphs.

The first stage of operation is video calibration. The input video from line 271 is processed by the Level Clamper 868 where it is direct-coupled and terminated to 75 ohms. The Level Clamper includes (in block 868) a buffer amplifier, a summing amplifier, and a video activity detector to perform the following video processing. The input video is applied to the buffer amplifier, the summing amplifier, and the video activity detector. The buffer amplifier output is applied to sample-and-hold logic that determines the voltage level of the video sync tips (with sampling derived at the horizontal frequency). This voltage level is scaled and applied to the second input of the summing amplifier. Thus the summing amplifier output is the input video clamped (sync-tip) to local ground. The video activity detector is level-independent logic that is slew-rate sensitive to typical video sync level transitions.

The clamped video is converted by the SYNC/LUM Digitizer 866 to TTL-level luminance and sync signals via two voltage comparator circuits (part of block 866). The second input to each comparator is a digital-to-analog conversion of a 6-bit field (sync level or data level) provided by the Decoder Video Parameter Register in the Register Block 870. The Sync Level Field is nominally scaled to be variable from clamped sync tip level to the blanking level. The Data Level Field is nominally scaled to be variable from blanking level to 50% saturated white. These programmable values allow autocalibration software to obtain "best" performance. The separated composite sync signal is used by the GEN-Lock Logic 864 to GEN-Lock an internal video sync generator to the external video signal. As long as video activity is detected, the GEN-Lock logic 864 performs a coarse horizontal raster stability test, which if passed, applies horizontal locking resets to the internal video sync generator. Horizontal stability also enables a vertical locking reset derived from the fifth serration pulse of the video sync vertical interval. This logic can achieve GEN-Locked status in as little as 33 milliseconds and can hold lock even on the output of a fairly shaky video cassette recorder. The outputs of the internal sync generator are used for the overall video decoder timing and for the video sync interrupt regardless of locked/unlocked status. However, unlocked status will inhibit or abort actual data collection with error flags.

The second stage of operation is video decoding without actual data collection. This stage is entered after PDP-11/45 initialization software in the support system 262 provides three parameters and sets an enable bit. The first parameter selects one of 12 data decoding frequencies to match the BM/VE encoding rate. The other two parameters (8-bit fields in the Decoding Envelope Register) define the decoding envelope start line and decoding envelope line count. The decoding envelope generator uses these parameters (along with the internal sync generator outputs) to select the contiguous portion (or decoding envelope) of each video field that is to be processed by the manchester-to-NRZ converter. The decoding envelope is additionally gated with horizontal blanking and provides a decode-enable to the manchester converter with resets between each raster line during horizontal sync. Two error flags are associated with the decoding envelope. These errors are failure of the envelope to occur (if enabled) between vertical blanking intervals and failure by the manchester converter 862 of detecting any encoded word preamble sync waveforms within the decoding envelope. The manchester converter 862 decodes the digitized luminance into NRZ data using a biphase decoding clock from circuit 860 at 12 times the encoded data rate. The decoding clock (up to 48 Megahertz) is derived from reference crystal oscillators (24.0 and 14.31818 Megahertz) 858 by divider/Phase-Lock-Loop logic 860 (using Signetics NE564 PLL oscillators). The phase detectors of the NE564 oscillators are also used to generate decoding frequency stability status signals. As a result the manchester converter 862 can operate at 12 programmable data rates ranging from 1.19 to 4.00 Megahertz. The Manchester-to-NRZ Convertor 862 performs the initial stage of digital data recovery/decoding from the digitized video luminance signal. The Manchester Convertor uses the following functions to acheive this data recovery/decoding. The manchester converter design was based on quantizing the luminance signal into an 8-bit data shift register at the decoding clock rate (12×data rate). The first two stages of the data shift register acted as a transition finder for a 16-bit transition shaft register with supporting logic testing transition validity. The validity testing (after the word start transition) is always relative to the prior transition with an allowable "window-variation" of three decoding clocks. The transition logic would also insert one missing transition (e.g., the missing phase transition for manchester data "1" followed by data "0") but would declare a manchester format error on two sequential missing transitions. The transition shift register also operates as an activity-detector/word-time-out function. The transition shift register logic also provides "data windows" and "phase windows" that are gated with the outputs of a directional transition finger (operating on the last two stages of the data shift register) to separate the manchester signal into data and phase transitions for "black-to-white" and "white-to-black" (logic 1 or "up" and logic 0 or "down" respectively). The phase transitions are then ignored within a word-decoding envelope except for testing that each windowed data/phase transition is followed by an opposite polarity windowed phase/data transition or else the second type of manchester format error is declared. When enabled, the manchester converter has two states. In the first state, the converter searches for the encoded preamble sync wave form sequence of "data-up/phase-down/phase-up/data-down". When the sync preamble is detected, the actual manchester-to-NRZ conversion state is entered with the assertion of word-envelope. The conversion state uses the windowed data transitions to generate the NRZ serial data and data clock. The word-envelope is terminated by manchester format error (which includes transition time-out) or by receipt of 17 decoded bits (16 data bits+parity bit). The converter 862 then returns to the preamble-search-state. The converter outputs via transmitter 856 to the front-plane receiver 832 are:

Transition activity status
Preamble-sync detected status (pulse)
Word (decoding envelope)
Serial NRZ data
Serial data clock (gated by word envelope)
Bit-Count-OK flag
Manchester format error flag
Parity error flag The third stage of Video Decoder operation is the actual data collection which includes serial-to-parallel conversion and parity checking. Data collection occurs only on a "go" command from the computer of support system 262 which is normally "triggered" by the video sync interrupt. Data is collected from the first complete decoding envelope that occurs after the go command. The collected data is normally transferred to the support system 262 via DMA, but small raw data files containing 60 word-pairs or less may be accumulated in the FIFO Data Stack Register 824 to be transferred by direct PCIO access. Prior to issuing a DMA-Enable/Go, the computer of support system 262 must initialize the DMA Address Pointer Register DPTR and the Word Count Limit Register WCLR. The Word Count Register WCLR is a "Limit"-type because the size of the raw data file cannot be assumed to be fixed but an error flag will be set on count-overflow that inhibits further DMA writes to support system 262 memory. Once started, the collect-data-logic and NRZ converter generates at least one word pair (hardware decoding status word and decoded data word) for every horizontal raster within the decoding envelope. If a particular raster has no detectable preamble syncs by the end of that raster, a word pair is entered into the Data Stack Register DSTKR with the Empty Line Status Flag set and a fill word in the decoded data position. Otherwise, each preamble sync within a raster generates a work pair entry with appropriate flags set in the hardware status word and the decoded data (or the right-justified portion of the data received prior to a hardware decoding error). The data collection cycle is terminated after completion of the decoding envelope and any pending DMA cycles required to empty the Data Stack Register.

The Video Decoder recognizes 15 error conditions that have individual flags in the Video Decoder Error Register VDER. Four of these error flags act as a summary of all decoded rasters for the hardware decoding status word errors of Line Overflow Error, Manchester Format Error, Bit-Count Error, and Parity Error. Another summary-type error is provided to flag the condition of a horizontal raster with decoded data that had no detectable command cell. The remaining 10 errors directly affect data collection and these errors fall into three classes. The first class is a sequence error which aborts the collection cycle if the go-command was issued during video or decoding clock time instability. The second class of errors terminates DMA but allows data collection to continue within the storage limits of the Data Stack Register DSTKR. The second class of errors includes DMA access time-out, word count overflow, and any attempt to DMA-write to the computer operating system memory space of the support system 262. The third class of errors terminates data collection but allows completion of any pending DMA cycles. The third class of errors can occur only within the decoding envelope and include video stability lost, decoding frequency stability lost, no detectable preamble sync waveforms (by end of envelope), data stack overflow, and any decoding envelope timing error.

III. VIDEO ENCODING FORMAT

The video encoding format implemented in the BM/VE is the direct result of experience in the flight test programs mentioned in Section I of report AFW-AL-TR-83-1156. The problems of data recovery from video recorded on an airborne VCR can be simplified into three categories. The first category is vertical instability which primarily results from aircraft acceleration affecting the VCR tape tensioning mechanism. The second category is horizontal instability which primarily results from aircraft vibration affecting VCR tape skew. The third category is tape imperfections which can cause momentary video dropout which can seriously affect video encoding without significantly degrading the video image. Even when these problems do degrade the video image, this degradation can usually be improved by using a Video Time Base Corrector (VTBC) with the playback VCR. While the VTBC will cause some loss of data due to quantification errors, there is a net gain in data recovery that results from the improved video stability. The combination of VCR and VTBC also has three troublesome tricks when correcting for video instability that must be provided for in the data recovery process. These tricks occur because the VTBC either averages out instability or delays the instability to the bottom of each video field which is normally off-screen on a display monitor. The first trick is that small vertical instability may be corrected by field-reversing" the video sync relative to the image data. Also during normal operation the VTBC will delay all luminance data including the encoding envelope from the nominal position within the video field by several vertical raster positions. The second trick is that the VTBC will compensate for instability by varying the size of this delay between successive video fields. Typically, the position of the encoding envelope can jitter as much as two vertical positions. The third trick occurs for relatively large horizontal errors like those that occur on momentary dropout. The VTBC might correct the instability by repeating the prior horizontal raster or by decreasing the internal delay by one raster line within that field. Thus, the data recovery process can see the encoding envelope vary in position and decrease in size with the missing raster line even being from the middle of the envelope. It can even see a normal size envelope with one line missing and one line repeated. These problems are in addition to the more normal recovery problems of noise, signal distortion, and reference clock stability/accuracy which tend to be evenly distributed throughout the encoding envelope. Therefore the key formatting characteristics should have the features of:

a. A unique video field identifier with redundancy to increase the probability of recovery
b. A unique line identifier in each encoded raster within the encoding envelope
c. Independent word encoding so that recovery errors do not propagate forward.
d. Status information to improve error recovery
e. The use of manchester encoding to reduce sensitivity to time instability.

While these characteristics increase the encoding overhead percentage, our experience shows it to be a worthwhile investment. Two additional features are required in the data recovery process. The first feature is that encoded word detection should not require error-free word recovery bit should flag recovery errors. The second feature is that the recovery process must be capable of handling a horizontal raster with no detectable encoding even though encoding may have been expected on that raster. This feature allows the data recovery process (Video Decoder) to "over-decode" or in other words to use a decoding envelope several rasters larger on each end then the expected encoding envelope. Thus, the encoding envelope will remain within the decoding envelope even if the encoding envelope has a vertical positional jitter.

The basic unit of encoding is the word cell. The word cell format (with examples) is shown in FIG. 9. The word cell contains 20-bit cells of encoding with a minimum interword gap of 2-bit cells containing no activity. The word cell consists of 3-bit cells of preamble sync followed by 16-bit cells of data (most significant bit first) followed by a parity bit cell. The parity bit and the 16 data bits provide for an odd parity check on data recovery. The preamble sync is an invalid manchester pattern which is used for word detection by the Video Decoder. The actual video encoding is unipolar luminance transitions between the video black level and the (nominal) saturated white level. In 1-volt RS-170 composite video, this black-white transition is nominally 0.5 volts. The black-to-white (or "UP") and white-to-black (or "DOWN") transitions are respectively defined as logic one and logic zero. As with normal manchester, transitions at the "phase" point (half-way between data points) are for setup of data transition of the same polarity as the prior transition. The 3-bit cell preamble sync consists of the sequence data-up (the first transition after an encoding gap is defined as a data transition) followed by a phase-down followed by a "missing" data-up followed by an actual phase-up followed by a data-down. An alternate way to describe the preamble sync is that it is a manchester 110 with the second data transition delayed to the phase point. This invalid manchester sequence following an encoding interword gap (of two bit cells or more) with the signal at the "rest" or black level is readily identifiable as a start-of-word to the Video Decoder. Since the rest condition for encoding is defined as black level, when the encoding parity bit is a logic one (data-up), it is necessary to follow the parity bit one with a "null" transition of phase-down to return the video level to the rest state. As shown in FIG. 9 Example A, this null transition does not impinge on the 2-bit cell minimum interword gap.

Figure 11:
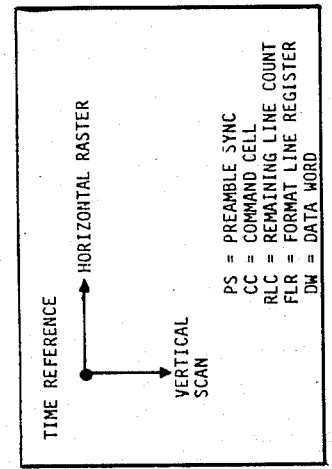
FIG. 11 is a chart showing examples of encoding envelopes.

The encoding envelope has two levels of formatting. The first level is that all encoded words on any individual raster are preceded by an encoded command cell. The format of the command cell is given in FIG. 10. The command cell specifies how many word cells follow the command cell on that raster line and contains a unique identifier for each raster that also functions as an encoded raster countdown value that specifies the remaining number of encoded rasters within the encoding envelope. The command cell contains two flags to indicate video status and one flag to indicate an encoding abort at the end of the current raster due to any data/timing errors within the BM/VE. The command cell also has two flags that identify that encoding raster as a data raster or as a format raster. The format raster is the second level of format structure within an encoding envelope. The format raster is repeated twice within each encoding envelope as the first and last rasters within the envelope. The only difference between the two format rasters is in the Remaining Line Count in the command cell on each raster. If no actual data is encoded in a particular video field, the two format rasters are contiguous. FIG. 11 gives three examples of video fields with encoding envelopes. A format raster contains three encoding cells consisting of a command cell followed by two encoding cells containing Format Line Register #1 (FLR#1) and Format Line Register #2 (FLR#2). The format registers contain a 20-bit video field counter that provides the video encoding time reference. The field counter increments with each (video) vertical drive unless the BM/VE is attempting to acquire GEN-Lock to the external video. The field counter is also synchronized to identify the even/odd video fields. FLR#1 provides the capability to define a "data file" of between one and 16 contiguous fields, each field containing a data subfile within the encoding envelope. The data file structure information consists of a 4-bit subfile initial value and a 4-bit subfile counter in addition to two flags for start-of-file and end-of-file. The contents of the format line registers are given in FIG. 12.

The encoding format provides support for several different types of data files. Large data files may be encoded in multiple subfiles or alternatively as a large encoding envelope that "steals" a video field at some interval such as once a second. Data files can be encoded after acquisition at less than 60 hertz since encoded data need not be incorporated in every video field. Also unneeded image data can be sacrificed to allow encoding envelopes that are larger than the horizontal portion of the vertical blanking interval. While this format has an overhead that could typically run about 25% of data, the formatting information readily supports data recovery processes that give a high probability that loss of individual data words will not cause loss of the entire data file.

IV. SOFTWARE

The software for the Bus Monitor/Video Encoder is broken into four major categories: Support Software (Section IV-1), BM/VE System Software (Section IV-2), Bus-Monitor Software (Section IV-3), Video-Encoder Software, (Section IV-4), and Software Summary (Section IV-5).

The support software consists of all software which is used for the generation of test data and the verification of the performance of the BM/VE system or subsystems. Primarily, there are two major programs required to support the development of the BM/VE system, the 1553B bus simulator for circuit 268 and the video decoder for circuit 24.

The BM/VE system software consists of the necessary programs to support operations of the BM/VE system 10. These programs include a terminal communication link program and special loader used to downline load the BM/VE system through an RS-232 link 280, a program for the EPROM Programmer 226, an 8086 cross-assembler and linker for the monitor CPU 212, and 8086 loader program, and necessary device drivers to support the I/O to the various devices supporting the BM/VE.

The Bus-Monitor software is the operational 8086 software in EPROM circuit 226. The 8086 cross-assembler and linker programs were obtained from a Digital Equipment Corporation Users Society (DECUS) Structured Languages SIG tape and were written in Pascal. The loader program is written in RATFOR and runs in the LSI-11 main CPU 210 under an RSX-11S operating system. The EPROM programmer 226 program also is written in RATFOR and runs in the RSX-11S system in the main CPU 210

The Video Encoder software is the operational LSI-11 software which controls execution of the bus-monitor software and performs the data packet encoding control function. This software is completely PDP-11 (LSI-11) MACRO-11 assembly code. The code was developed on the PDP-11/45 RSX-11M system and downloaded into the LSI-11 main CPU 210 via a custom loader program, also written in MACRO-11 and resident in the EPROM 226 in the BM/VE. The software developed for the BM/VE system 10 was developed on a PDP-11/45 using the RSX-11M operating system. All support software was written in RATFOR (a structured Fortran pre-processor). IV-1. Support Software In order to test the BM/VE functions, certain hardware and software had to be built and generated. One piece of hardware required was a 1553B bus simulator 268. This was necessary to provide 1553B data for debugging the Bus-Monitor function of the BM/VE. After the 1553B bus simulator hardware was built, software was required to generate several programs to support the 1553B bus simulator. One of these programs generates a data file containing the necessary control and data words to output to the 1553B bus simulator itself. The 1553B bus simulator requires a specific format for the control and data words sent to it. This program generates the data files which conform to this required format. The program allows for varying any of the controllable parameters, such as channel selection, number of data words, terminal ID, forced parity errors, etc.

The other necessary program was one which reads the data file created by the above program and outputs it to the 1553B bus simulator itself. This program allows for up to three different files to be accessed and output in sequence to the generator. In order to provide for minimum system overhead, the 1553B bus simulator allows for continuous DMA operation. This means that the program can start the simulator in DMA loop mode and then wait for an error or a signal to terminate the transfer. This provides for a very high data rate transfer to be sent over the 1553B bus. Alternatively, the program can output the data files on a scheduled basis, allowing for total program control of the interval between file transmissions. This mode generates a profile which has high data burst rates at a lower interval than can be obtained with DMA loop mode.

In order for the program to operate in the RSX-11M environment, a device driver had to be written to interface between the user program and the hardware registers in the 1553B bus simulator. This device driver has to support both program mode I/O and DMA operations. Since the hardware can support continuous loop mode DMA, the driver has to be non-standard, in that I/O can be happening after the driver returns a successful completion code to the user. Also, if an error occurs after initiation of the loop mode DMA, an interrupt occurs to the driver with no I/O packet queued, which will crash the operating system. These details were resolved and the final driver successfully supported the required operations of both programmed I/O and continuous loop mode DMA.

The other end of the system required a means of validating the encoded data. This required the design of a Video Decoder 24. Similarly, the video decoder required software to acquire the data from the decoder and to analyze that data to determine the validity of the decoding. The validation program consisted of code to snap-shot blocks of decoded data and count data errors. The program initialized the decoder with an automatic sync level setup procedure. Then the decoder parameters were set based on user defined values. These parameters determined the starting line and number of lines to decode. Using these parameters and an assumed value of three data words per line, the total number of data words expected were computed. This was used in computing the percent data error rate. Tests were performed in four modes: (1) raw video from the encoder, (2) raw video from the encoder processed through a time base corrector (TBC), (3) recorded video, and (4) recorded video processed through the TBC. It was experimentally determined that the error rate was significantly reduced if the decoding window started one or two lines before the actual encoding started.

IV-2. BM/VE System Software

There are many support programs involved in the BM/VE system 10. The first program required to support the BM/VE directly is the terminal communication program resident on the host system, the PDP-11/45 support system 262. This communication program is a combination of RATFOR code and MACRO-11 code. The program code is more than just a terminal emulator or terminal link program. It has the capability to redirect terminal input and/or output to a disk file. Also, input disk files can be down-loaded to the LSI-11 main CPU 210 via the micro ODT in the main CPU 210. Using this program, a pre-loader is loaded into the main CPU 210 which is subsequently used to download a full RSX-11S system into the main CPU. This second loader was burned into EPROM so the load process consists of setting up the memory management registers to map to the EPROM 226 and then executing the loader code. The loader code was written in MACRO-11 and is position-dependent, using no RAM for scratch, only registers, and not even a stack. This allows the code to execute out of EPROM to fully load the main CPU RAM without requiring any stack space. The loader program is status driven, and provides for block loading with a validity checksum returned to the PDP-11/45 support system 262 upon completion.

The terminal link program can load the standard main CPU 210 diagnostic programs from disk files for execution in the main CPU. These include CPU exerciser, Memory Management exerciser, Memory exerciser, and Floating Point exerciser. Another special file type which can be downloaded is an 8086 load module. This is a text file which is an ASCII Hexadecimal dump (essentially) of the region of memory to load. This file is generated by the 8086 linker. This code can be sent to the main CPU 210 by the terminal link program, but must be read by the 8086 loader program running in the main CPU. As indicated above, the link program can also load an RSX-11S system image file to the main CPU 210 either with the LSI-11 loader program running or with the micro ODT in the main CPU. The link operates split rate, 9600 baud transmission to the LSI-11, 1200 baud transmission to the PDP. This allows fast loading of the main CPU 210 with the EPROM resident loader; a full 64K Word RSX-11S system can be loaded in about 2.5 minutes.

The terminal link program is essentially an AST driven processor. Asynchronous System Traps (AST's) are handled by the program as they occur. AST's occur for input from the user keyboard or from the main CPU, and for output to the user display and the main CPU 210. Each of these AST's sets a unique local event flag, which is detected by the main program for subsequent conditional processing.

The normal mode of communication for the terminal link program is interactive communication. In this mode, the user's terminal appears to be directly connected to the main CPU 210. Certain special characters are detected by the AST handler in the program and special event flags are set to indicate which special character has been typed. Upon detection of one of these event flags, the main program calls a special subroutine to handle the request. These requests are typically for loading of files, or for exiting the link program. In order to handle the I/O rate, the link program must run at software priority 250 under RSX. This is the highest priority available with the RSX-11M operating system. Due to the large overhead of terminal I/O, any lower priority results in loss of characters from the main CPU 210.

In order to load the 8086 load modules, there is another program which runs in the main CPU 210 in the RSX-11S system, the LOAD86 program. This program reads a load module from the input (loaded from a file by the link program), decodes the hexadecimal dump format, and stores the decoded values in 8086 memory. This dual-ported memory is mapped as a resident common in the RSX-11S system, and mapped to in the LOAD86 program. Additionally, if the LOAD86 program detects that the address being loaded is actually in the EPROM 226, it attempts to program that address with the desired contents. If the programmer power supply is not on, or an error occurs during programming, the BM/VE system must be shut down and restarted from power-off. This prevents inadvertently over-writing good code in the EPROM.

IV-3. Bus-Monitor Software

The Bus-Monitor Software is the 8086 code which is used to perform the data collection from the 1553 data bus 15. The code allows for selective device monitoring, and automatically discards messages which contain no data, unless there is an error. The bus-monitor code is resident in the Dual-Port RAM/PROM 224 for immediate execution by the 8086 monitor CPU 212 upon being enabled. All data for both control of the monitoring and for output from the decoder is located in the shared RAM area.

Information which is required by the monitor software at startup is the current date and time of day (used to initialize IRIG clock), and a list of devices (1553 terminal ID codes) to monitor. This information is located at fixed addresses in the shared RAM. The Video-Encoder Software initializes these locations when it starts the monitor CPU 212 the first time. After that, the locations are assumed to be correct.

The bus monitor code consists of an initialization section, and several interrupt code blocks. The primary operation of the monitor is via a hard coded monitor loop which continuously monitors the status of the 1553 decoder hardware. When there is data available in the stack, the program reads the data in a loop until the stack is empty. During this read cycle, the program is monitoring the buffer contents to determine if the last buffer read had any data in it, or if there are any errors. If there is no data and no errors, the buffer point is reset to the start of the last data packet, thus ignoring empty, error-free messages. When the data buffer overflows, the input buffer is switched, and the main CPU 210 is informed of the overflow via an interrupt request. The bus-monitor program then continues its monitoring operation, first by retrieving IRIG time and placing it at the beginning of the new buffer. By doing this, each buffer of data is time tagged with the current time, accurate to the nearest 1/100 second.

The main CPU 210 can also interrupt the monitor CPU 212 for special processing. There are four interrupts available from the main CPU. These can be used for tracing execution of the 8086 code in the monitor CPU 212, or for altering or reinitializing the monitoring functions. The devices which are being monitored are loaded into the decoder hardware registers only upon initialization of the 8086 monitor code. Therefore, in order to deselect or select a new device, the device code bit must be cleared or set in the common RAM area, then the monitor code must be reinitialized. This is done with one of the available interrupts. Another interrupt is used to take a snapshot dump of the monitor CPU 8086 registers. This is used for debugging the 8086 code. On interrupt, the monitor CPU 212 saves all of its registers in locations in shared RAM, available for inspection by the main CPU. It also saves the IRIG time in shared RAM. The other two interrupts from the main CPU are not used.

There are two interrupt lines from the monitor CPU 212 to the main CPU 210. Interrupt request A is used for any error detected by the monitor CPU. Interrupt request B is used for indication of buffer overflow and subsequent switching of data buffers by the monitor program in the monitor CPU. Error interrupts are identified by the monitor CPU before asserting request A. An error type flag is loaded into a location in shared RAM, which is examined by the main CPU upon receipt of interrupt A. This way, a common monitor CPU error handler can be used for all errors. Specifically, an occurrence of an error, the monitor CPU places the error code from the A register into the flag location in shared RAM, then sets interrupt request A. Depending on the type of error the monitor CPU will either halt or return to its normal processing via a restart operation.

In addition to the two software interrupt requests, the hardware status of the monitor CPU 212 is tied to two more interrupts, the stopped interrupt, and the error interrupt. If the monitor CPU stops for any reason, or encounters an error, the corresponding request is set. With the use of these four interrupts, complete status of the 8086 monitor CPU software is available to the main CPU 210.

IV-4. Video-Encoder Software

The Video-Encoder Software is the heart of the BM/VE system 10 software. All operations are controlled by this software. The video-encoder software is an interrupt driven operating system written in MACRO-11. It is task built as a system under the RSX-11M operating system on the PDP-11/45. It is downloaded into the main CPU 210 from the PDP-11 support system 262 via the terminal link program and the main CPU resident checksum loader in EPROM 226.

The video-encoder program is a custom real-time operating system. It has the capability of examining and modifying any memory location in the main CPU 210 or the shared RAM. When the program is loaded and initiated, there are two basic modes of operation: (1) Video-Encoder control mode and (2) 8086 monitor CPU control mode. In both modes, all commands are single-letter commands entered from the RS-232 terminal link 280. The two modes are toggled back and forth with the ESCAPE key. In each mode, a '?' will display a HELP page with brief explanations of each command available. Any number which is entered is placed into the increment register. This register is actually a memory location, not a CPU register, and is used for all of the video-encoder parameter modifications. This register is also used for examining and modifying memory locations. All output to the terminal is via a large FIFO ring-buffer. This buffer can be flushed with the 'Q' (Queue) command. Using a FIFO queue assures that no messages will be lost due to timing problems. There may, however, be a significant delay between the occurrence of an event and the eventual display of a corresponding message if the queue is not nearly empty.

The command parser was written in such a way that commands could be added or deleted easily. This allowed for addition of debugging code with special temporary command codes if necessary. The command parser was essentially a look-up table generated offset to a process dispatch table. One of two process dispatch tables was used, depending on the mode (encoder control or 8086 control).

IV-5. Software Summary

The BM/VE software is a combination of higher-order language programs for support (RATFOR) and the assembly language programs and systems for the real-time operations. The design methodology of the assembly language programs was one of high-order design and debug followed by assembly language coding. This maintained the overall structured design of the software while allowing maximum efficiency and control from an assembly language system.

The design of the software was considered in the design of the hardware and vice versa. The software designer/programmer was an integral part of the hardware design process.

It is understood that certain modifications to the invention as described may be made, as might occur to one with skill in the field of this invention, within the scope of the appended claims. Therefore, all embodiments contemplated hereunder which achieve the objects of the present invention have not been shown in complete detail. Other embodiments may be developed without departing from the spirit of the invention or from the scope of the appended claims.

What is claimed is:

1. Apparatus for monitoring a data bus, selecting data from the bus, encoding the data, and multiplexing the encoded data with a video signal from a separate video source; the data bus being a device addressable multiplex serial digital data bus having a plurality of devices coupled thereto, each device having a unique device address field included in messages which it sends via the data bus; said apparatus comprising:
 apparatus bus means having coupled thereto CPU means, programmable memory means, random access memory means, bus decoder means, and video encoder means, the bus decoder means being also coupled to said data bus;
 wherein the video encoder means comprises video logic means coupled between said video source and a video output, the video logic means being also coupled to the apparatus bus means;
 wherein the apparatus includes means for performing actual data acquisition from the data bus as a passive function with programmable data selection under control of the CPU means, using the device address fields, the bus decoder means including means for receiving data from the data bus and performing preprocessing of messages, means to time-tag data messages, and to assemble data messages into a message block buffer;
 wherein the video encoder means includes means for synchronizing an internal video timing generator to the video signal from the video source, and means for receiving selected data messages from the message block buffer, means for formatting and encoding the messages as encoded data signals, and insertion of encoded data signals into the video signal for output to said video output.

2. Apparatus according to claim 1, wherein said means for formatting and encoding includes:
 means for defining an encoding envelope comprising a contiguous block of horizontal raster lines as encoded rasters in a field;
 means for providing a unique field identifier with redundancy to increase the probability of recovery,
 means for providing a unique line identifier in each encoded raster within the encoding envelope,
 means for independent word encoding so that recovery errors do not propagate forward,
 means to provide status information to improve error recovery, and
 means for using manchester encoding to reduce sensitivity to time instability.

3. Apparatus for monitoring a data bus, selecting data from the bus, encoding the data, and multiplexing the encoded data with a video signal from a separate video source; the data bus being a device addressable multiplex serial digital data bus having a plurality of devices coupled thereto, each device having a device address, to send messages with a serial data word transmission sequence including message control words having the device addresses and message data words; said apparatus comprising:
 a bus monitor subassembly and a video encoder subassembly:
 wherein the bus monitor subassembly comprises a main bus, a monitor bus, a main CPU coupled to the main bus, a monitor CPU coupled to the monitor bus, bus decoder means coupled between said data bus and the monitor bus, the bus decoder means including bus decoder control circuitry, a monitor interface coupled between the main bus and the monitor bus, the monitor interface being also coupled to the monitor CPU, first memory means coupled to both the monitor bus and the main bus, said first memory means including a programmer which comprises programmable read only memory means coupled to the main bus, and second memory means comprising random access memory coupled to the main bus;
 wherein the video encoder subassembly comprises an encoder bus coupled via video encoder interface means to the main bus, video logic means coupled between said video source and a video output, the video logic means being also coupled to the encoder bus, video locking and control circuits coupled to the encoder bus and also to the video logic means, encoder control means coupled to the encoder bus, formatter encoder means coupled to the encoder bus and also to the video logic means, and data control means coupled to the encoder bus;
 wherein the main CPU has over-ride mode-control means and access means to the monitor CPU and the monitor bus, the main and monitor CPUs have program interrupt cross-linkage means and also share said first memory means, the main CPU having means to use the first memory means to provide the monitor CPU with task programs and to access acquired data, the main CPU includes means for using said programmer for permanent entry of monitor CPU subroutine programs;
 wherein the main CPU includes means under software control for performing tasks, including (a) means operating in real time for gaining and holding synchronization with said video signal from the video source via video locking and control functions of the video encoder subassembly via the main bus, (b) means operating in real time for oversight of bus-monitor subassembly operations and the interchange of empty and full data buffers for acquired message data blocks, (c) means operating in real time for synchronization and queuing of full message data blocks from the data bus, and (d)

means for exception handling and error recovery for the bus monitor and video encoder;

wherein the bus monitor subassembly includes means for performing actual data acquisition from the data bus under direct control of the monitor CPU, using the device addresses, the bus decoder means including means for receiving data from the data bus and performing message grouping of the serial data word transmission sequence, with means effective as each message is received for testing the device address of the control words against a programmable look-up table to identify message treatment, and means based on end-of message for the monitor CPU to delete non-data messages, to time-tag data messages, and to assemble data messages into a message block buffer supplied by the main CPU;

wherein the video-encoder subassembly includes means for synchronizing an internal video timing generator to the video signal from the video source, and means for the generation and insertion of encoded data signals into the video signal for output to said video output.

4. Apparatus according to claim 3, wherein said formatter encoder means includes:

means for defining an encoding envelope comprising a contiguous block of horizontal raster lines as encoded rasters in a field;

means for providing a unique field identifier with redundancy to increase the probability of recovery, means for providing a unique line identifier in each encoded raster within the encoding envelope, means for independent word encoding so that recovery errors do not propagate forward, means to provide status information to improve error recovery, and means for using manchester encoding to reduce sensitivity to time instability.

5. Apparatus according to claim 3, wherein said formatter encoder means includes:

means for defining an encoding envelope comprising a contiguous block of horizontal raster lines as encoded rasters in a field;

means for providing a word cell format in which each word cell contains N-bit cells of encoding with a minimum interword gap of 2-bit cells containing no activity, the word cell consists of 3-bit cells of preamble followed by M-bit cells of data, followed by a parity bit cell, the actual video encoding being unipolar luminance transitions between a video black level and a (nominal) saturated white level;

wherein the encoding envelope has two levels of formatting, the first level being that all encoded words on any individual raster are preceded by an encoded command cell which specifies how many word cells follow the command cell on that raster line and contains a unique identifier for each raster that also functions as an encoded raster coundown value that specifies the remaining number of encoded rasters within the encoding envelope, with the command cell containing one flags to indicate video status and one flag to indicate an encoding abort at the end of the current raster due to any data/timing errors within the apparatus, the command cell also having two flags that identify that encoding raster as a data raster or as a format raster, the format raster being a second level of format structure within an encoding envelope, the format raster being repeated twice within each encoding envelope as the first and last raster within the envelope, the only difference between the two format rasters being in a "remaining line count" in the command cell of each raster, the two format rasters being contiguous if no actual data is encoded in a particular video field;

so that the encoding format provides support for several different types of data files, and large data files may be encoded in multiple subfiles or alternatively as a large encoding envelope that "steals" a video field at some interval.

* * * * *